US012593244B2

(12) United States Patent
Wu et al.

(10) Patent No.: US 12,593,244 B2
(45) Date of Patent: Mar. 31, 2026

(54) METHOD AND DEVICE FOR RADIO RESOURCE DETERMINATION

(71) Applicant: Apogee Networks, LLC, Dallas, TX (US)

(72) Inventors: Keying Wu, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 410 days.

(21) Appl. No.: 17/940,997

(22) Filed: Sep. 8, 2022

(65) Prior Publication Data

US 2023/0007534 A1    Jan. 5, 2023

Related U.S. Application Data

(63) Continuation of application No. PCT/CN2021/081540, filed on Mar. 18, 2021.

(30) Foreign Application Priority Data

| Mar. 18, 2020 | (CN) | 202010191363.3 |
| Mar. 27, 2020 | (CN) | 202010228751.4 |
| Mar. 20, 2022 | (CN) | 202010200555.6 |

(51) Int. Cl.
    *H04W 28/06* (2009.01)
    *H04L 5/00* (2006.01)
    *H04W 72/566* (2023.01)

(52) U.S. Cl.
    CPC ........... *H04W 28/06* (2013.01); *H04L 5/0044* (2013.01); *H04W 72/569* (2023.01); *H04L 5/0005* (2013.01)

(58) Field of Classification Search
    CPC ... H04W 28/06; H04W 72/569; H04W 72/04; H04L 5/0044; H04L 5/0005
    See application file for complete search history.

(56) References Cited

U.S. PATENT DOCUMENTS 9,107,191 B2 *   8/2015   Chen ..................... H04L 5/0057
11,895,657 B2 *  2/2024   Takeda .................. H04L 5/0057
(Continued)

FOREIGN PATENT DOCUMENTS

| CN | 110535617 A | 12/2019 |
| CN | 110808819 A | 2/2020 |

(Continued)

OTHER PUBLICATIONS

ISR received in application No. PCT/CN2021/081540 dated Jun. 28, 2021.
(Continued)

*Primary Examiner* — Jay P Patel
(74) *Attorney, Agent, or Firm* — Volpe Koenig

(57) ABSTRACT

The present disclosure provides a method and a device in a node for wireless communications. A first node receives a first signaling and a second signaling; and transmits a first signal in a first radio resource block. The first signaling is used to determine the first radio resource block; the first signal carries a first bit block and a second bit block, of which the first bit block is associated with the first signaling, and a third bit block is associated with the second signaling, the third bit block being used to generate the second bit block; a number of bits comprised in the first bit block is used to determine a first resource size, a second resource size is used to determine a size of time-frequency resources occupied by the first signal. The method proposed herein improves resource utilization ratio of the wireless system.

20 Claims, 6 Drawing Sheets

(56) References Cited

U.S. PATENT DOCUMENTS

| | | | | |
|---|---|---|---|---|
| 2010/0281486 | A1 | 11/2010 | Lu | |
| 2011/0103335 | A1* | 5/2011 | Golitschek Edler Von Elbwart | H04L 5/0057 370/329 |
| 2012/0263118 | A1 | 10/2012 | Love | |
| 2016/0100422 | A1* | 4/2016 | Papasakellariou | H04L 1/1822 370/329 |
| 2016/0302252 | A1 | 10/2016 | Wang | |
| 2019/0090233 | A1 | 3/2019 | Fong | |
| 2019/0349964 | A1 | 11/2019 | Liou | |
| 2019/0387481 | A1* | 12/2019 | Yang | H04W 52/18 |
| 2020/0014491 | A1* | 1/2020 | Takeda | H04L 5/0055 |
| 2020/0178241 | A1* | 6/2020 | Wu | H04L 5/0055 |
| 2020/0245364 | A1* | 7/2020 | Kim | H04W 74/0833 |
| 2020/0351801 | A1* | 11/2020 | Jeon | H04W 52/48 |
| 2021/0105787 | A1* | 4/2021 | Park | H04W 72/542 |
| 2021/0168011 | A1* | 6/2021 | Davydov | H04L 5/0048 |
| 2021/0337538 | A1* | 10/2021 | Li | H04L 5/0057 |
| 2021/0385852 | A1* | 12/2021 | Papasakellariou | H04L 1/0072 |
| 2022/0210743 | A1* | 6/2022 | Yi | H04W 52/16 |
| 2023/0048080 | A1* | 2/2023 | Takahashi | H04W 72/1263 |
| 2023/0078444 | A1* | 3/2023 | Maleki | H04L 5/0094 370/311 |
| 2023/0239864 | A1* | 7/2023 | Kim | H04L 1/1642 370/329 |
| 2023/0299902 | A1* | 9/2023 | Farag | H04L 5/0051 370/329 |
| 2024/0334438 | A1* | 10/2024 | Li | H04W 72/21 |

FOREIGN PATENT DOCUMENTS

| | | | | |
|---|---|---|---|---|
| WO | | 2011035627 | A1 | 3/2011 |
| WO | WO-2016155458 | A1 | * | 10/2016 ........... H04W 72/23 |
| WO | | 2018228425 | A1 | 12/2018 |
| WO | | 2019156969 | A1 | 8/2019 |
| WO | | 2019161181 | A1 | 8/2019 |

OTHER PUBLICATIONS

First Search Report of Chinses patent application No. CN202010200555.6 dated Apr. 9, 2022.

First Search Report of Chinses patent application No. CN202010228751.4 dated Mar. 21, 2022.

First Office Action of Chinses patent application No. CN202010228751.4 dated Mar. 28, 2022.

Notification to Grant Patent Right for Invention of Chinses patent application No. CN202010200555.6 dated Apr. 15, 2022.

Notification to Grant Patent Right for Invention of Chinses patent application No. CN202010228751.4 dated Aug. 16, 2022.

Qualcomm Incorporated UCI Enhancements for eURLLC 3GPP TSG-RAN WG1 #96b R1-1905020 Apr. 3, 2019.

Intel Corporation Discussion on multi-beam enhancements 3GPP TSG RAN WG1 Meeting #99 R1-1912223 Nov. 8, 2019.

Ericsson On spatial relation switching delay requirements 3GPP TSG RAN WG4 Meeting #94-e R4-2002088 Feb. 14, 2020.

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

100
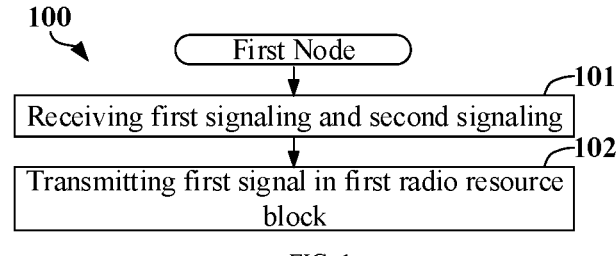
First Node
— 101
Receiving first signaling and second signaling
— 102
Transmitting first signal in first radio resource block
FIG. 1
5GS/EPS 200
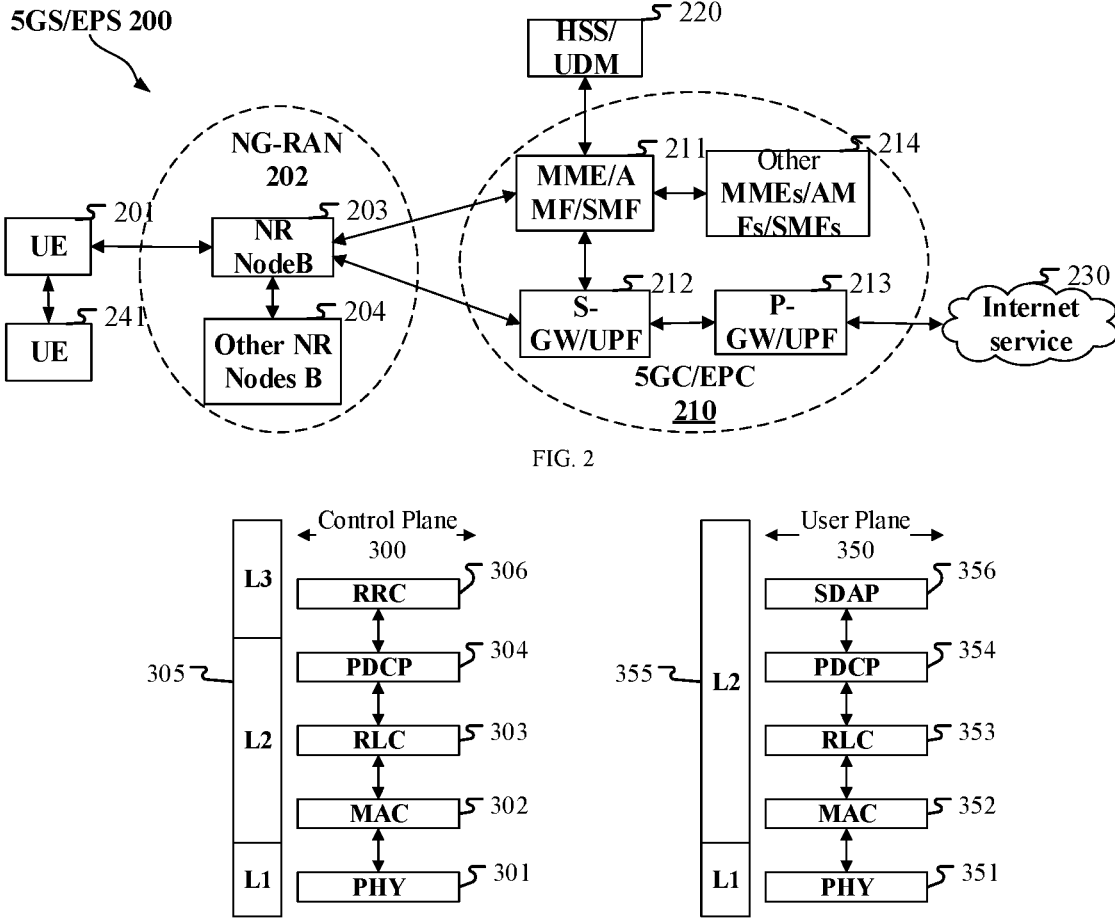
FIG. 2
FIG. 3

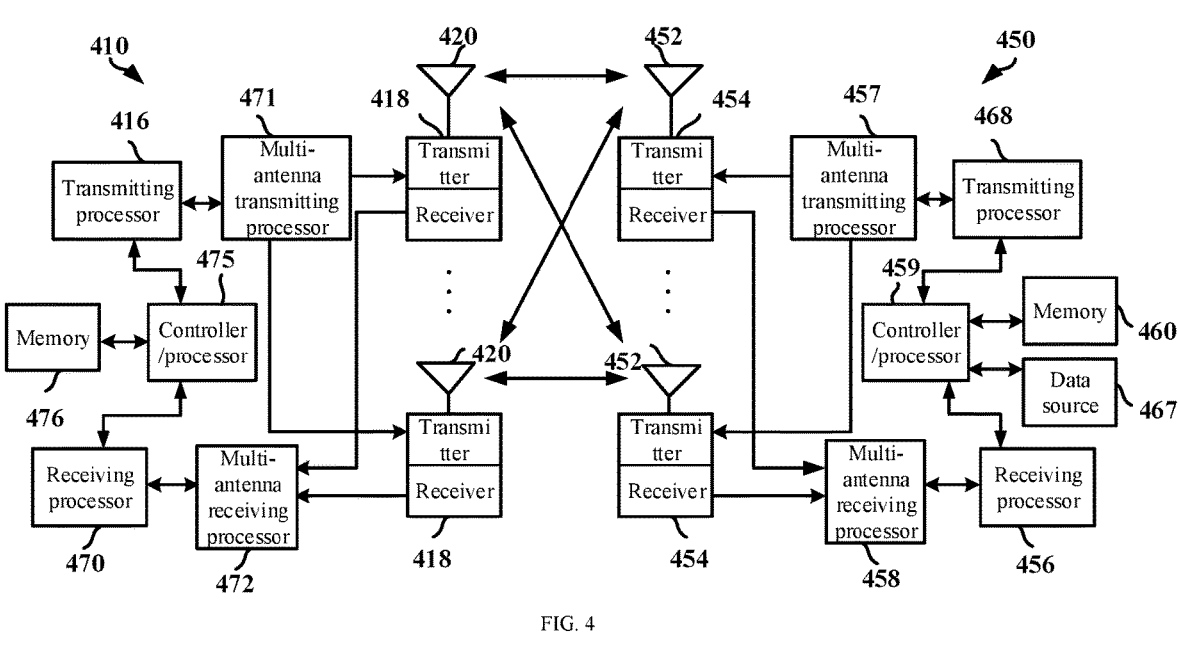

FIG. 4

| Second node U1 | | First node U2 |
|---|---|---|

S5101.transmitting first information block

————first information block————→

S5201.receiving first information block    F51. optional

S511.transmitting second signaling

————second signaling————→

S521.receiving second signaling

S5102.transmitting third signal

————third signal————→

S5202.receiving third signal    F52. optional

S512.transmitting first signaling

————first signaling————→

S522.receiving first signaling

S5103.transmitting second signal

————second signal————→

S5203.receiving second signal    F53. optional

S523.transmitting first signal in first radio resource block

←————first signal————

S513.receiving first signal in first radio resource block ( End )        ( End )

FIG. 5

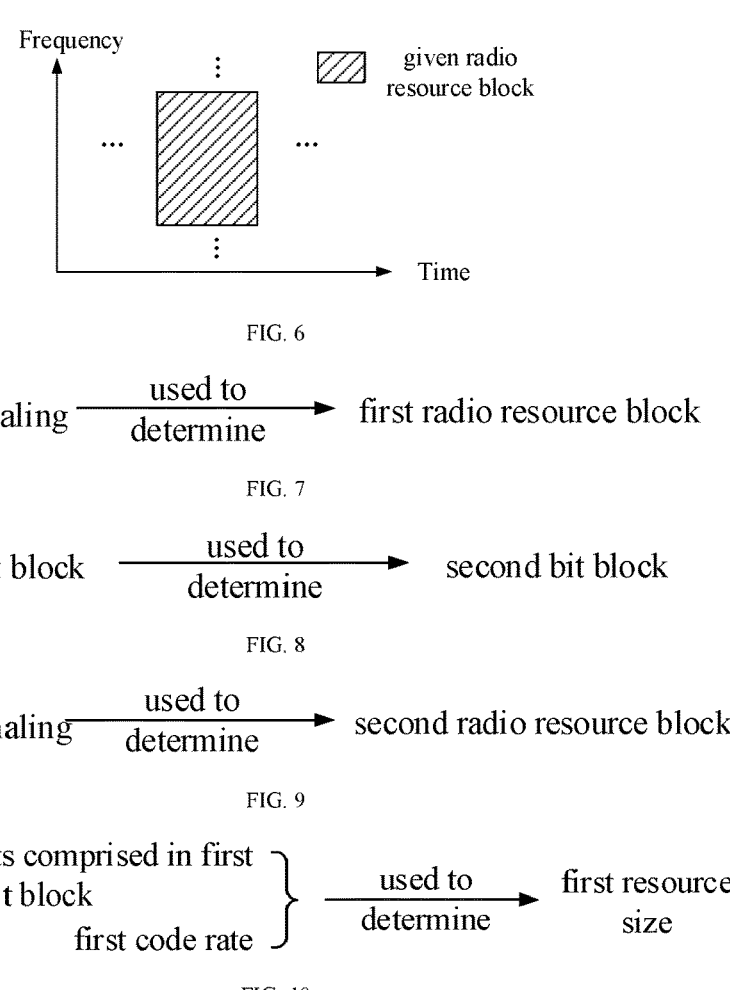

FIG. 6 first signaling $\xrightarrow[\text{determine}]{\text{used to}}$ first radio resource block

FIG. 7 third bit block $\xrightarrow[\text{determine}]{\text{used to}}$ second bit block

FIG. 8 second signaling $\xrightarrow[\text{determine}]{\text{used to}}$ second radio resource block

FIG. 9

$\left.\begin{array}{l}\text{Number of bits comprised in first} \\ \text{bit block} \\ \text{first code rate}\end{array}\right\}$ $\xrightarrow[\text{determine}]{\text{used to}}$ first resource size

FIG. 10

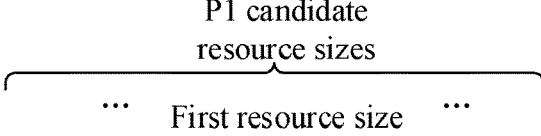

P1 candidate
resource sizes

First resource size

FIG. 11

Number of bits comprised in second bit block $\leqslant$ K0 - Number of bits comprised in first bit block

FIG. 12

$\dfrac{\text{Second resource size}}{\text{First resource size}} \leqslant$ First threshold

FIG. 13

Second resource size $\leqslant$ min (third resource size, $\underbrace{\text{first resource size} \times \text{first threshold}}_{\text{first reference resource size}}$)

FIG. 14

( second resource size - first resource size )  $\leqslant$  second threshold

FIG. 15

Second resource size  $\leqslant$  min (third resource size, first resource size + second threshold)

$\underbrace{\phantom{\text{first resource size + second threshold}}}_{\text{Second reference resource size}}$

FIG. 16

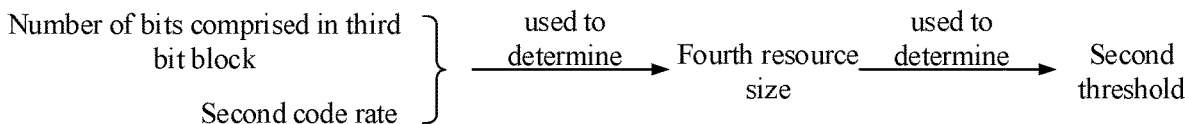

Number of bits comprised in third bit block  $\left.\begin{array}{c}\\\\\end{array}\right\}$  $\xrightarrow[\text{determine}]{\text{used to}}$  Fourth resource size  $\xrightarrow[\text{determine}]{\text{used to}}$  Second threshold Second code rate

FIG. 17

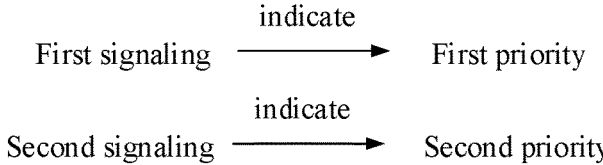

First signaling  $\xrightarrow[\phantom{xx}]{\text{indicate}}$  First priority

Second signaling  $\xrightarrow[\phantom{xx}]{\text{indicate}}$  Second priority

FIG. 18

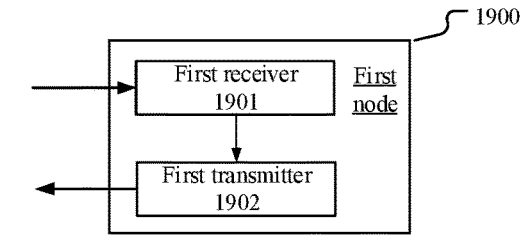

First receiver 1901     First node

First transmitter 1902

Second transmitter 2001     Second node

Second receiver 2002

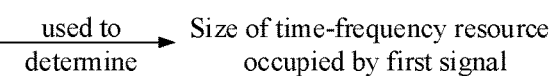

A sum of number of bits comprised in first bit block and number of bits comprised in second bit block  $\xrightarrow[\text{determine}]{\text{used to}}$  Size of time-frequency resources occupied by first signal

FIG. 21

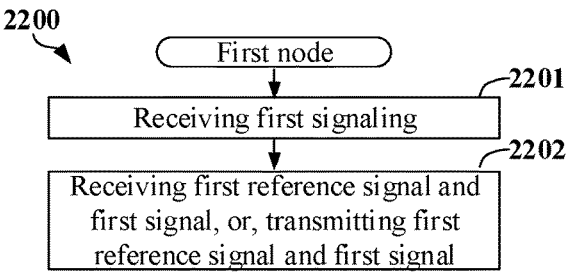

2200

First node

Receiving first signaling — 2201

Receiving first reference signal and first signal, or, transmitting first reference signal and first signal — 2202

FIG. 22

Second node U3 | First node U4

S23301.transmitting second information block
——second information block——
S23401.receiving second information block
F231. optional S2331.transmitting first signaling
——first signaling——
S2341.receiving first signaling S2332.transmitting first reference signal
——first reference signal——
S2342.receiving first reference signal S23402.transmitting first information block
——first information block——
S23302.receiving first information block
F232. optional S2333.transmitting first signal
——first signal——
S2343.receiving first signal End | End

FIG. 23

Second node U5 | First node U6

S24501.transmitting second information block
——second information block——
S24601.receiving second information block
F241. optional S2451.transmitting first signaling
——first signaling——
S2461.receiving first signaling S2462.transmitting first signal
——first signal——
S2452.receiving first signal S2463.transmitting first reference signal
——first reference signal——
S2453.receiving first reference signal End | End

FIG. 24 first index  —used to determine→  Spatial-domain relation of first signal

FIG. 25

First signaling —used to determine→ First priority —used to determine→ First information

FIG. 26

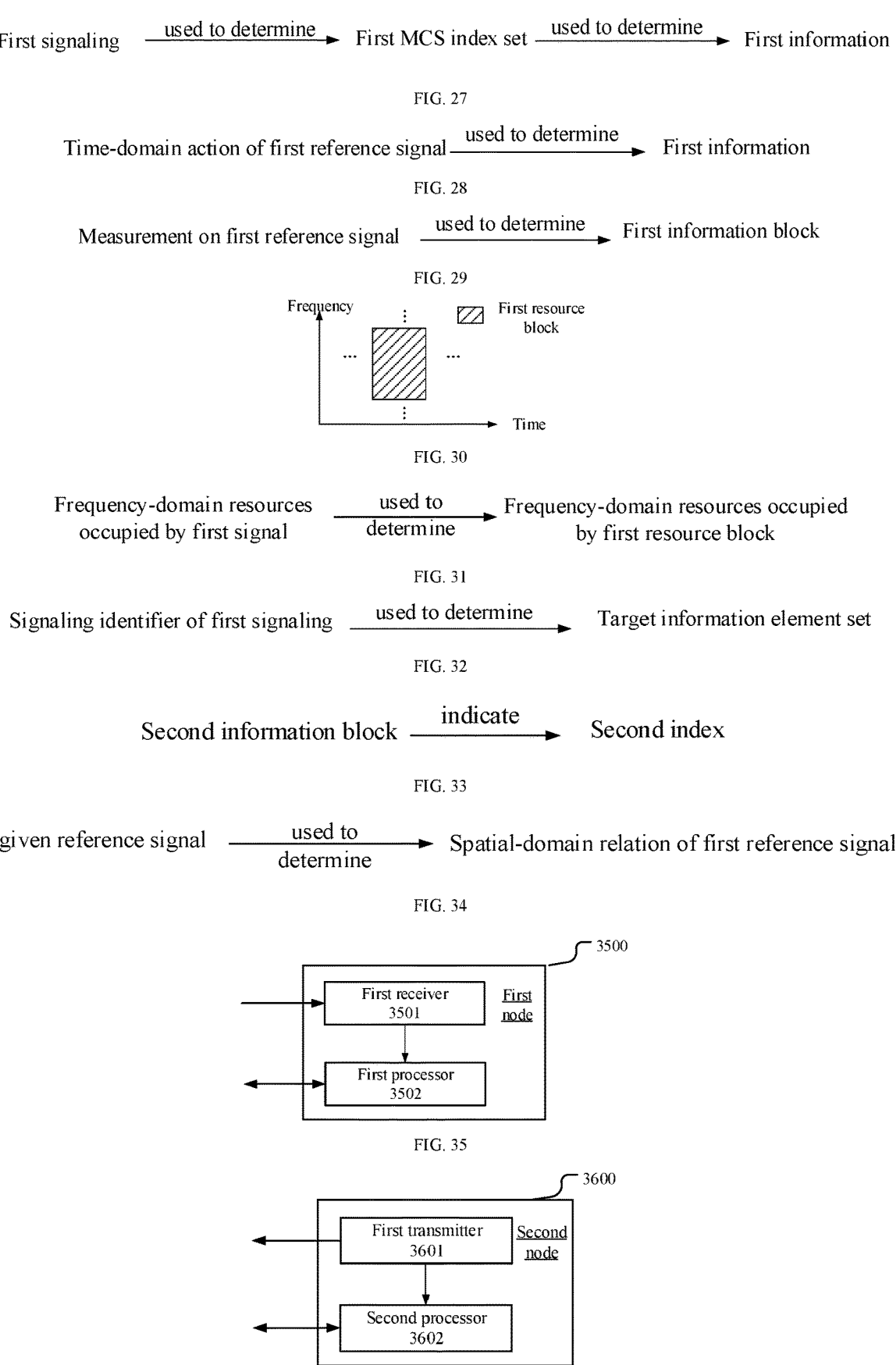

First signaling ——used to determine—► First MCS index set ——used to determine—► First information

FIG. 27

Time-domain action of first reference signal ——used to determine—► First information

FIG. 28

Measurement on first reference signal ——used to determine—► First information block

FIG. 29

Frequency

⬚ First resource block

FIG. 30

Frequency-domain resources occupied by first signal ——used to determine—► Frequency-domain resources occupied by first resource block

FIG. 31

Signaling identifier of first signaling ——used to determine—► Target information element set

FIG. 32

Second information block ——indicate—► Second index

FIG. 33 given reference signal ——used to determine—► Spatial-domain relation of first reference signal

First receiver 3501    First node

First processor 3502

First transmitter 3601    Second node

Second processor 3602

FIG. 36

METHOD AND DEVICE FOR RADIO RESOURCE DETERMINATION

CROSS REFERENCE TO RELATED APPLICATIONS

This application is the continuation of International patent application PCT/CN2021/081540, filed on Mar. 18, 2021, which claims the priority benefit of Chinese Patent Application No. 202010200555.6, filed on Mar. 20, 2020, and the priority benefit of Chinese Patent Application No. 202010191363.3, filed on Mar. 18, 2020, and the priority benefit of Chinese Patent Application No. 202010228751.4, filed on Mar. 27, 2020, the full disclosure of which is incorporated herein by reference.

BACKGROUND

Technical Field

The present disclosure relates to transmission methods and devices in wireless communication systems, and in particular to a method and device of radio signal transmission in a wireless communication system supporting cellular networks.

Related Art

Compared with the traditional 3rd Generation Partner Project (3GPP) Long-term Evolution (LTE) system, a New Radio (NR) system can support more diverse application scenarios, such as enhanced Mobile BroadBand (eMBB), Ultra-Reliable and Low Latency Communications (URLLC) and massive Machine-Type Communications (mMTC). The URLLC is more demanding on transmission reliability and delay than other scenarios, and NR Release (R) 16 has introduced various priorities to support these scenarios. Once there is a conflict between transmissions of various priorities, a low-priority transmission will be dropped to guarantee the performance of a high-priority transmission. The URLLC's requirements on the transmission reliability and delay may differ from any other scenario by a couple of orders of magnitude, thus leading to the difference between designs of a physical layer data channel and a physical layer control channel requested by each application scenario.

SUMMARY

Inventors find through researches that in order to reduce the performance loss of low-priority transmission, different priorities of data can be multiplexed on a same channel on the condition that high-priority transmission is not influenced. Therefore, there is an urgent issue to be solved, that is, how to design a rational multiplexing scheme to optimize low-priority transmission while ensuring the performance of high-priority transmission and meanwhile avoid resource wastes.

Inventors find through researches that a more precise channel and interference estimation shall be provided to make sure that URLLC scenario meets the needs of high reliability and low delay. So, how to enhance the Channel State Information (CSI) feedback mechanism to further improve the feedback accuracy remains a problem to be solved.

To address the above problems, the present disclosure provides a solution. It should be noted that though the present disclosure only took the URLLC scenario and transmission based on multiple priorities for example in the statement above, it is also applicable to other communication scenarios of eMBB, mMTC, single-priority-based transmission, Carrier Aggregation (CA) or V2X, where similar technical effects can be achieved. Additionally, the adoption of a unified solution for various scenarios (including but not limited to URLLC, eMBB, mMTC, multi-priority transmission, single-priority transmission, CA and V2X) contributes to the reduction of hardcore complexity and costs. If no conflict is incurred, embodiments in a first node in the present disclosure and the characteristics of the embodiments are also applicable to a second node, and vice versa. What's more, the embodiments in the present disclosure and the characteristics in the embodiments can be arbitrarily combined if there is no conflict.

The present disclosure provides a method in a first node for wireless communications, comprising:

receiving a first signaling and a second signaling; and transmitting a first signal in a first radio resource block;

herein, the first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

In one embodiment, a problem to be solved in the present disclosure includes how to multiplex different priorities of data in a same channel. By associating sizes of time-frequency resources respectively occupied by the data with different priorities, the method proposed above proves to be a good solution.

In one embodiment, characteristics of the above method include that the first bit block and the third bit block respectively correspond to different priorities, and the size of a time-frequency resource occupied by the third bit block in the first radio resource block is related to the size of a time-frequency resource occupied by the first bit block in the first radio resource block.

In one embodiment, advantages of the above method include ensuring the transmission reliability and delay requirements of high-priority data.

In one embodiment, advantages of the above method include reducing performance loss of low-priority data and meanwhile avoiding a decrease in resource utilization ratio that results from the low-priority data's occupancy of excessive resources during conflicts of transmissions of different priorities.

According to one aspect of the present disclosure, comprising:

receiving a second signal;

herein, the first signaling is used to determine configuration information of the second signal, the second signal being used to generate the first bit block.

According to one aspect of the present disclosure, comprising:

receiving a third signal;

herein, the second signaling is used to determine configuration information of the third signal, the third signal being used to generate the third bit block.

According to one aspect of the present disclosure, comprising:

receiving a first information block;

herein, the first information block comprises configuration information of the first radio resource block.

According to one aspect of the present disclosure, the above method is characterized in that the second signaling is used to determine a second radio resource block, the second radio resource block being reserved for the third bit block; the first radio resource block and the second radio resource block are overlapping in time domain.

According to one aspect of the present disclosure, the above method is characterized in that the number of bits comprised in the first bit block and a first code rate are used to determine the first resource size, the first radio resource block corresponding to the first code rate.

According to one aspect of the present disclosure, the above method is characterized in that a ratio of the second resource size to the first resource size is no greater than a first threshold.

According to one aspect of the present disclosure, the above method is characterized in that a difference between the second resource size and the first resource size is no greater than a second threshold.

According to one aspect of the present disclosure, the above method is characterized in that a number of bits comprised in the third bit block and a second code rate are used to determine the second threshold.

According to one aspect of the present disclosure, the above method is characterized in that the first signaling indicates a first priority, while the second signaling indicates a second priority; the first priority is different from the second priority.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

transmitting a first signaling and a second signaling; and receiving a first signal in a first radio resource block;

herein, the first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

According to one aspect of the present disclosure, comprising:

transmitting a second signal;

herein, the first signaling is used to determine configuration information of the second signal, the second signal being used to generate the first bit block.

According to one aspect of the present disclosure, comprising:

transmitting a third signal;

herein, the second signaling is used to determine configuration information of the third signal, the third signal being used to generate the third bit block.

According to one aspect of the present disclosure, comprising:

transmitting a first information block;

herein, the first information block comprises configuration information of the first radio resource block.

According to one aspect of the present disclosure, the above method is characterized in that the second signaling is used to determine a second radio resource block, the second radio resource block being reserved for the third bit block; the first radio resource block and the second radio resource block are overlapping in time domain.

According to one aspect of the present disclosure, the above method is characterized in that the number of bits comprised in the first bit block and a first code rate are used to determine the first resource size, the first radio resource block corresponding to the first code rate.

According to one aspect of the present disclosure, the above method is characterized in that a ratio of the second resource size to the first resource size is no greater than a first threshold.

According to one aspect of the present disclosure, the above method is characterized in that a difference between the second resource size and the first resource size is no greater than a second threshold.

According to one aspect of the present disclosure, the above method is characterized in that a number of bits comprised in the third bit block and a second code rate are used to determine the second threshold.

According to one aspect of the present disclosure, the above method is characterized in that the first signaling indicates a first priority, while the second signaling indicates a second priority; the first priority is different from the second priority.

According to one aspect of the present disclosure, the above method is characterized in that the second node is a base station.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first receiver, which receives a first signaling and a second signaling; and a first transmitter, which transmits a first signal in a first radio resource block;

herein, the first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

The present disclosure provides a second node for wireless communications, comprising:

a second transmitter, which transmits a first signaling and a second signaling; and a second receiver, which receives a first signal in a first radio resource block;

herein, the first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

The present disclosure provides a method in a first node for wireless communications, comprising:

receiving a first signaling; and receiving a first reference signal and a first signal, or, transmitting a first reference signal and a first signal;

herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, a problem to be solved in the present disclosure includes how to increase precision of CSI feedback. By associating a spatial relation of a reference signal under channel measurement and a spatial relation of a data transmission, the method proposed above solves the problem.

In one embodiment, characteristics of the above method include that a channel measurement over the first reference signal will be used for determining a Tx parameter of the first signal, and the first signaling can indicate a spatial relation of the first reference signal and a spatial relation of the first signal at the same time.

In one embodiment, advantages of the above method include that the precision of CSI feedback can be enhanced, with a reduction in delay and corresponding signaling overhead.

According to one aspect of the present disclosure, the above method is characterized in that the first signaling is used to determine a first priority, the first priority being used to determine the first information.

According to one aspect of the present disclosure, the above method is characterized in that the first signaling indicates a first MCS index from a first MCS index set, the first MCS index is applied to the first signal, and the first MCS index set is used to determine the first information.

According to one aspect of the present disclosure, the above method is characterized in that a time-domain behavior of the first reference signal is used to determine the first information.

In one embodiment, advantages of the above method include preventing both sides of communications from understanding the spatial relation of a reference signal in a different way due to misdetection of a dynamic signaling.

According to one aspect of the present disclosure, comprising:

transmitting a first information block;

herein, the first node receives the first reference signal and the first signal; a measurement on the first reference signal is used to determine the first information block.

According to one aspect of the present disclosure, the above method is characterized in that the first information block comprises a first channel quality, and a first resource block is a reference resource corresponding to the first channel quality; a frequency-domain resource occupied by the first signal is used to determine a frequency-domain resource occupied by the first resource block.

In one embodiment, advantages of the above method include making CSI feedback more targeted and the feedback overhead lower.

According to one aspect of the present disclosure, the above method is characterized in that the first information unit belongs to a target information unit set; the target information unit set is a first information unit set or a second information unit set; a first signaling identifier of the first signaling is used to determine the target information unit set.

According to one aspect of the present disclosure, comprising:

receiving a second information block;

herein, the second information block indicates a second index; when the first information is used to determine that the first index is not used for determining a spatial relation of the first reference signal, the second index is used to determine a spatial relation of the first reference signal.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

transmitting a first signaling; and transmitting a first reference signal and a first signal, or, receiving a first reference signal and a first signal;

herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

According to one aspect of the present disclosure, the above method is characterized in that the first signaling is used to determine a first priority, the first priority being used to determine the first information.

According to one aspect of the present disclosure, the above method is characterized in that the first signaling indicates a first MCS index from a first MCS index set, the first MCS index is applied to the first signal, and the first MCS index set is used to determine the first information.

According to one aspect of the present disclosure, the above method is characterized in that a time-domain behavior of the first reference signal is used to determine the first information.

According to one aspect of the present disclosure, comprising:

receiving a first information block;

herein, the second node transmits the first reference signal and the first signal; a measurement on the first reference signal is used to determine the first information block.

According to one aspect of the present disclosure, the above method is characterized in that the first information block comprises a first channel quality, and a first resource block is a reference resource corresponding to the first channel quality; a frequency-domain resource occupied by the first signal is used to determine a frequency-domain resource occupied by the first resource block.

According to one aspect of the present disclosure, the above method is characterized in that the first information unit belongs to a target information unit set; the target information unit set is a first information unit set or a second information unit set; a first signaling identifier of the first signaling is used to determine the target information unit set.

According to one aspect of the present disclosure, comprising:

transmitting a second information block;

herein, the second information block indicates a second index; when the first information is used to determine that the first index is not used for determining a spatial relation of the first reference signal, the second index is used to determine a spatial relation of the first reference signal.

According to one aspect of the present disclosure, the above method is characterized in that the second node is a base station.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first receiver, which receives a first signaling; and a first processor, which receives a first reference signal and a first signal, or, which transmits a first reference signal and a first signal;

herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

The present disclosure provides a second node for wireless communications, comprising:

a first transmitter, which transmits a first signaling; and a second processor, which transmits a first reference signal and a first signal, or, which receives a first reference signal and a first signal;

herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, the present disclosure has the following advantages over the prior art:

When different priorities of transmissions are conflicting with each other, enabling different priorities of data to be multiplexed in a same channel helps reduce the performance loss of low-priority data.

When multiplexing occurs, transmission reliability and delay requirements of high-priority data can be guaranteed.

When multiplexing occurs, a decrease of resource utilization ratio resulting from excessive resources being occupied by low-priority data can be avoided.

In one embodiment, the present disclosure has the following advantages over the prior art:

The precision of CSI feedback is improved, while the feedback delay and corresponding signaling overhead is reduced.

The CSI feedback is more targeted, with feedback overhead reduced.

BRIEF DESCRIPTION OF THE DRAWINGS

Other features, objects and advantages of the present disclosure will become more apparent from the detailed description of non-restrictive embodiments taken in conjunction with the following drawings:

FIG. 1 illustrates a flowchart of a first signaling, a second signaling and a first signal according to one embodiment of the present disclosure.

FIG. 2 illustrates a schematic diagram of a network architecture according to one embodiment of the present disclosure.

FIG. 3 illustrates a schematic diagram of a radio protocol architecture of a user plane and a control plane according to one embodiment of the present disclosure.

FIG. 4 illustrates a schematic diagram of a first communication device and a second communication device according to one embodiment of the present disclosure.

FIG. 5 illustrates a flowchart of wireless transmission according to one embodiment of the present disclosure.

FIG. 6 illustrates a schematic diagram of a given radio resource block according to one embodiment of the present disclosure.

FIG. 7 illustrates a schematic diagram of a first signaling being used to determine a first radio resource block according to one embodiment of the present disclosure.

FIG. 8 illustrates a schematic diagram of a third bit block being used to generate a second bit block according to one embodiment of the present disclosure.

FIG. 9 illustrates a schematic diagram of a second signaling being used to determine a second radio resource block according to one embodiment of the present disclosure.

FIG. 10 illustrates a schematic diagram of a number of bits comprised in a first bit block being used to determine a first resource size according to one embodiment of the present disclosure.

FIG. 11 illustrates a schematic diagram of a number of bits comprised in a first bit block being used to determine a first resource size according to one embodiment of the present disclosure.

FIG. 12 illustrates a schematic diagram of a second resource size being used to determine a number of bits comprised in a second bit block according to one embodiment of the present disclosure.

FIG. 13 illustrates a schematic diagram of a ratio of a second resource size to a first resource size being no greater than a first threshold according to one embodiment of the present disclosure.

FIG. 14 illustrates a schematic diagram of a first resource size being used to determine a second resource size according to one embodiment of the present disclosure.

FIG. 15 illustrates a schematic diagram of a difference between a second resource size and a first resource size being no greater than a second threshold according to one embodiment of the present disclosure.

FIG. 16 illustrates a schematic diagram of a first resource size being used to determine a second resource size according to one embodiment of the present disclosure.

FIG. 17 illustrates a schematic diagram of a number of bits comprised in a third bit block and a second code rate being used to determine a second threshold according to one embodiment of the present disclosure.

FIG. 18 illustrates a schematic diagram of a first priority and a second priority according to one embodiment of the present disclosure.

FIG. 19 illustrates a structure block diagram of a processing device in a first node according to one embodiment of the present disclosure.

FIG. 20 illustrates a structure block diagram of a processing device in a second node according to one embodiment of the present disclosure.

FIG. 21 illustrates a schematic diagram of size of a time-frequency resource occupied by a first signal according to one embodiment of the present disclosure.

FIG. 22 illustrates a flowchart of a first signaling, a first reference signal and a first signal according to one embodiment of the present disclosure.

FIG. 23 illustrates a flowchart of wireless transmission according to one embodiment of the present disclosure.

FIG. 24 illustrates a flowchart of wireless transmission according to one embodiment of the present disclosure.

FIG. 25 illustrates a schematic diagram of a first index being used to determine a spatial relation of a first signal according to one embodiment of the present disclosure.

FIG. 26 illustrates a schematic diagram of a first priority being used to determine first information according to one embodiment of the present disclosure.

FIG. 27 illustrates a schematic diagram of a first MCS index set being used to determine first information according to one embodiment of the present disclosure.

FIG. 28 illustrates a schematic diagram of a time-domain behavior of a first reference signal being used to determine first information according to one embodiment of the present disclosure.

FIG. 29 illustrates a schematic diagram of a first information block according to one embodiment of the present disclosure.

FIG. 30 illustrates a schematic diagram of a first resource block according to one embodiment of the present disclosure.

FIG. 31 illustrates a schematic diagram of a frequency-domain resource occupied by a first signal being used to determine a frequency-domain resource occupied by a first resource block according to one embodiment of the present disclosure.

FIG. 32 illustrates a schematic diagram of a signaling identifier of a first signaling being used to determine a target information unit set according to one embodiment of the present disclosure.

FIG. 33 illustrates a schematic diagram of a second index according to one embodiment of the present disclosure.

FIG. 34 illustrates a schematic diagram of a given reference signal being used to determine a spatial relation of a first reference signal according to one embodiment of the present disclosure.

FIG. 35 illustrates a structure block diagram of a processing device in a first node according to one embodiment of the present disclosure.

FIG. 36 illustrates a structure block diagram of a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Embodiment 1 illustrates a flowchart of processing of a first signaling, a second signaling and a first signal according to one embodiment of the present disclosure, as shown in FIG. 1. In step 100 illustrated by FIG. 1, each box represents a step. Particularly, the sequence of steps marked by different boxes does not necessarily represent specific chronological orders of respective steps.

In Embodiment 1, the first node in the present disclosure receives a first signaling and a second signaling in step 101; and transmits a first signal in a first radio resource block in step 102. Herein, the first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

In one embodiment, the first signaling comprises a dynamic signaling.

In one embodiment, the first signaling comprises a layer 1 (L1) signaling.

In one embodiment, the first signaling comprises an L1 control signaling.

In one embodiment, the first signaling comprises Downlink control information (DCI).

In one embodiment, the first signaling comprises one or more fields in a piece of DCI.

In one embodiment, the first signaling comprises one or more fields in a piece of Sidelink Control Information (SCI).

In one embodiment, the first signaling comprises DCI used for DownLink Grant.

In one embodiment, the first signaling comprises DCI used for UpLink Grant.

In one embodiment, the first signaling comprises a higher layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling is transmitted in DownLink.

In one embodiment, the first signaling is transmitted in SideLink.

In one embodiment, the second signaling comprises a dynamic signaling.

In one embodiment, the second signaling comprises an L1 signaling.

In one embodiment, the second signaling comprises an L1 control signaling.

In one embodiment, the second signaling comprises DCI.

In one embodiment, the second signaling comprises one or more fields in a piece of DCI.

In one embodiment, the second signaling comprises one or more fields in a piece of SCI.

In one embodiment, the second signaling comprises DCI used for DownLink Grant.

In one embodiment, the second signaling comprises DCI used for UpLink Grant.

In one embodiment, the second signaling comprises a higher layer signaling.

In one embodiment, the second signaling comprises an RRC signaling.

In one embodiment, the second signaling comprises a MAC CE signaling.

In one embodiment, the second signaling is transmitted in DownLink.

In one embodiment, the second signaling is transmitted in SideLink.

In one embodiment, an end time of a time-domain resource occupied by the first signaling is earlier than a start time of a time-domain resource occupied by the second signaling.

In one embodiment, an end time of a time-domain resource occupied by the second signaling is earlier than a start time of a time-domain resource occupied by the first signaling.

In one embodiment, the first signaling and the second signaling are overlapping in time domain.

In one embodiment, the first signal is a baseband signal.

In one embodiment, the first signal is a radio signal.

In one embodiment, the first signal is a radio frequency signal.

In one embodiment, the first signal comprises DeModulation Reference Signals (DMRS).

In one embodiment, the first bit block comprises a positive integer number of bit(s).

In one embodiment, bits comprised in the first bit block are arranged sequentially.

In one embodiment, the first bit block comprises Uplink control information (UCI).

In one embodiment, the first bit block comprises Hybrid Automatic Repeat reQuest-Acknowledgement (HARQ-ACK) information.

In one embodiment, the first bit block comprises Scheduling Request (SR) information.

In one embodiment, the first bit block comprises Channel State Information (CSI).

In one embodiment, the first bit block comprises Link Recovery Request (LRR) information.

In one embodiment, the first bit block comprises a Cyclic Redundancy Check (CRC) bit.

In one embodiment, the first bit block does not comprise a CRC bit.

In one embodiment, the second bit block comprises a positive integer number of bit(s).

In one embodiment, bits comprised in the second bit block are arranged sequentially.

In one embodiment, the second bit block comprises UCI.

In one embodiment, the second bit block comprises a CRC bit.

In one embodiment, the second bit block does not comprise a CRC bit.

In one embodiment, the third bit block comprises a positive integer number of bit(s).

In one embodiment, bits comprised in the third bit block are arranged sequentially.

In one embodiment, the third bit block comprises UCI.

In one embodiment, the third bit block comprises HARQ-ACK information.

In one embodiment, the third bit block comprises SR information.

In one embodiment, the third bit block comprises CSI.

In one embodiment, the third bit block comprises LRR information.

In one embodiment, the third bit block comprises a CRC bit.

In one embodiment, the third bit block does not comprise a CRC bit.

In one embodiment, a priority corresponding to the first bit block is higher than a priority corresponding to the third bit block.

In one embodiment, the first bit block corresponds to a first priority index, while the third bit block corresponds to a second priority index; the first priority index and the second priority index are respectively non-negative integers, and the first priority index is unequal to the second priority index.

In one embodiment, the first priority index is equal to 0, and the second priority index is equal to 1.

In one embodiment, the first priority index is equal to 1, and the second priority index is equal to 0.

In one embodiment, the first priority index is a default value.

In one embodiment, the second priority index is a default value.

In one embodiment, the first signaling indicates the first priority index, and the second priority index is set by default.

In one embodiment, the first signaling indicates the first priority index, and the second priority index is set with a default value of 0.

In one embodiment, the phrase that the first signal carries a first bit block and a second bit block means that the first signal is an output by all or part of bits in a target bit block sequentially through Channel Coding, Rate Matching, a Modulation Mapper, a Layer Mapper, a transform precoder, Precoding, a Resource Element Mapper, Multicarrier Symbol Generation, and, Modulation and Upconversion; the target bit block comprises all bits in the first bit block and all bits in the second bit block.

In one embodiment, the phrase that the first signal carries a first bit block and a second bit block means that the first signal is an output by all or part of bits in a target bit block sequentially through Channel Coding, Rate Matching, a Modulation Mapper, a Layer Mapper, Precoding, a Resource Element Mapper, Multicarrier Symbol Generation, and, Modulation and Upconversion; the target bit block comprises all bits in the first bit block and all bits in the second bit block.

In one embodiment, the phrase that the first signal carries a first bit block and a second bit block means that all or part of bits comprised in a target bit block are used for generating the first signal; the target bit block comprises all bits in the first bit block and all bits in the second bit block.

In one embodiment, a target bit block comprises all bits in the first bit block and all bits in the second bit block; an output by bits comprised in the target bit block being input to a same channel coding is used to generate the first signal.

In one embodiment, the target bit block is generated by concatenation of the first bit block and the second bit block.

In one embodiment, an output by the first bit block and the second bit block being jointly channel-encoded is used to generate the first signal.

In one embodiment, the first bit block and the second bit block correspond to a same Code Rate in the first radio resource block.

In one embodiment, the first bit block and the second bit block correspond to a same Modulation Scheme in the first radio resource block.

In one embodiment, the first resource size is measured in Resource Element (RE).

In one embodiment, the first resource size is measured in Physical Resource Block (PRB).

In one embodiment, the first resource size is measured in Resource Block (RB).

In one embodiment, the first resource size is equal to 1.

In one embodiment, the first resource size is greater than 1.

In one embodiment, the second resource size is measured in RE.

In one embodiment, the second resource size is measured in PRB.

In one embodiment, the second resource size is measured in RB.

In one embodiment, the second resource size is measured in a same unit as the first resource size.

In one embodiment, the second resource size is equal to 1.

In one embodiment, the second resource size is greater than 1.

In one embodiment, the second resource size is no less than the first resource size.

In one embodiment, the second resource size is greater than the first resource size.

In one embodiment, the second resource size is equal to the first resource size.

In one embodiment, the first resource size is no greater than a first resource size threshold.

In one embodiment, the second resource size is no greater than the first resource size threshold.

In one embodiment, the first resource size threshold is a positive integer.

In one embodiment, the first resource size threshold is measured in RE.

In one embodiment, the first resource size threshold is measured in PRB.

In one embodiment, a number of PRBs occupied by the first radio resource block is no greater than the first resource size threshold.

In one embodiment, a number of REs occupied by the first radio resource block is no greater than the first resource size threshold.

In one embodiment, the first resource size threshold is configured by an RRC signaling.

In one embodiment, the first information block indicates the first resource size threshold.

In one embodiment, the first resource size is one of P3 candidate resource sizes, P3 being a positive integer greater than 1; the P3 candidate resource sizes respectively correspond to P3 first-type values, the P3 first-type values being P3 mutually unequal positive integers respectively; a first reference value is a smallest first-type value no less than the number of bits comprised in the first bit block among the P3 first-type values, and the first resource size is one of the P3 candidate resource sizes corresponding to the first reference value.

In one embodiment, the size of the time-frequency resource comprises the number of REs.

In one embodiment, the size of the time-frequency resource comprises the number of PRBs.

In one embodiment, the second resource size is used to determine the number of REs occupied by the first signal.

In one embodiment, the second resource size is used to determine the number of PRBs occupied by the first signal.

In one embodiment, the size of a time-frequency resource occupied by the first signal is no greater than the second resource size.

In one embodiment, the size of a frequency-domain resource occupied by the first signal is no greater than the second resource size.

In one embodiment, the number of REs occupied by the first signal is no greater than the second resource size.

In one embodiment, the number of PRBs occupied by the first signal is no greater than the second resource size.

In one embodiment, the number of REs occupied by the first signal is equal to the second resource size.

In one embodiment, the number of PRBs occupied by the first signal is equal to the second resource size.

In one embodiment, the number of bits comprised in the third bit block is used to determine the second resource size.

In one embodiment, the first resource size and the number of bits comprised in the third bit block are jointly used to determine the second resource size.

In one embodiment, the first resource size, the number of bits comprised in the first bit block and the number of bits comprised in the third bit block are jointly used to determine the second resource size.

In one embodiment, the number of bits comprised in the second bit block is no greater than K2 being subtracted by the number of bits comprised in the third bit block.

In one embodiment, the number of bits comprised in the second bit block is less than the number of bits comprised in the third bit block.

In one embodiment, the number of bits comprised in the second bit block is equal to the number of bits comprised in the third bit block.

Embodiment 2

Embodiment 2 illustrates a schematic diagram of a network architecture according to the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G network architecture 200 may be called a 5G System/Evolved Packet System (5GS/EPS) 200 or other appropriate terms, which may comprise one or more UEs 201, a UE 241 in communication with UE(s) 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, vehicle-mounted equipment, vehicle-mounted communications units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW) 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) services.

In one embodiment, the first node in the present disclosure comprises the UE 201.

In one embodiment, the first node in the present disclosure comprises the UE 241.

In one embodiment, the second node in the present disclosure comprises the gNB 203.

In one embodiment, the second node in the present disclosure comprises the UE 241.

In one embodiment, a radio link between the UE 201 and the gNB 203 is a cellular link.

In one embodiment, a radio link between the UE 201 and the UE 241 is a Sidelink.

In one embodiment, a transmitter of the first signaling in the present disclosure comprises the gNB 203.

In one embodiment, a receiver of the first signaling in the present disclosure comprises the UE 201.

In one embodiment, a transmitter of the second signaling in the present disclosure comprises the gNB 203.

In one embodiment, a receiver of the second signaling in the present disclosure comprises the UE 201.

In one embodiment, a transmitter of the first signal in the present disclosure comprises the UE 201.

In one embodiment, a receiver of the first signal in the present disclosure comprises the gNB 203.

In one embodiment, a transmitter of the first reference signal in the present disclosure comprises the gNB 203.

In one embodiment, a receiver of the first reference signal in the present disclosure comprises the UE 201.

In one embodiment, a transmitter of the first reference signal in the present disclosure comprises the UE 201.

In one embodiment, a receiver of the first reference signal in the present disclosure comprises the gNB 203.

In one embodiment, a transmitter of the first signal in the present disclosure comprises the gNB 203.

In one embodiment, a receiver of the first signal in the present disclosure comprises the UE 201.

Embodiment 3

Embodiment 3 illustrates a schematic diagram of an example of a radio protocol architecture of a user plane and a control plane according to one embodiment of the present disclosure, as shown in FIG. 3.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes. The PDCP sublayer 304 provides varied radio bearers and multiplexing between logical channels, and also provides securing by packet encryption, as well as support for handover of a first communication node between second communication nodes. The RLC sublayer 303 provides higher-layer packet segmentation and reassembling, retransmission of a lost packet, and also packet reordering so as to compensate for disordered reception caused by Hybrid Automatic Repeat Request (HARQ). The MAC sublayer 302 provides multiplexing of a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversity of traffics. Although not described in FIG. 3, the first communication node may comprise several higher layers above the L2 305, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling is generated by the PHY 301 or the PHY 351.

In one embodiment, the first signaling is generated by the MAC sublayer 302 or the MAC sublayer 352.

In one embodiment, the second signaling is generated by the PHY 301 or the PHY 351.

In one embodiment, the second signaling is generated by the MAC sublayer 302 or the MAC sublayer 352.

In one embodiment, the first signal is generated by the PHY 301 or the PHY 351.

In one embodiment, the first reference signal is generated by the PHY 301 or the PHY 351.

In one embodiment, the first information block is generated by the PHY 301 or the PHY 351.

In one embodiment, the second information block is generated by the RRC sublayer 306.

In one embodiment, the second information block is generated by the MAC sublayer 302 or the MAC sublayer 352.

Embodiment 4

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In DL, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and constellation mapping based on each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 is also responsible for error detection using ACK and/or NACK protocols to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the DL, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network. The controller/processor 475 is also responsible for error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first signaling and the second signaling in the present disclosure; and transmits the first signal in the first radio resource block in the present disclosure. The first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

In one embodiment, the second communication device 450 comprises a memory that stores computer readable instruction program, the computer readable instruction program generates actions when executed by at least one processor, which include: receiving the first signaling and the second signaling in the present disclosure; and transmitting the first signal in the first radio resource block in the present disclosure. The first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first signaling and the second signaling in the present disclosure; and receives the first signal in the first radio resource block in the present disclosure. The first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

In one embodiment, the first communication device 410 comprises a memory that stores computer readable instruction program, the computer readable instruction program generates actions when executed by at least one processor, which include: transmitting the first signaling and the second signaling in the present disclosure; and receiving the first signal in the first radio resource block in the present disclosure. The first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling in the present disclosure; at least one of the antenna 420, the transmitter 418, the transmitting processor 416, the multi-antenna transmitting processor 471, the controller/processor 475 or the memory 476 is used to transmit the first signaling in the present disclosure.

In one embodiment, at least one of the antenna 452, the receiver 454, the receiving processor 456, the multi-antenna receiving processor 458, the controller/processor 459, the memory 460 or the data source 467 is used to receive the second signaling in the present disclosure; at least one of the antenna 420, the transmitter 418, the transmitting processor 416, the multi-antenna transmitting processor 471, the controller/processor 475 or the memory 476 is used to transmit the second signaling in the present disclosure.

In one embodiment, at least one of the antenna 420, the receiver 418, the receiving processor 470, the multi-antenna receiving processor 472, the controller/processor 475 or the memory 476 is used to receive the first signal in the first radio resource block in in the present disclosure; at least one of the antenna 452, the transmitter 454, the transmitting processor 468, the multi-antenna transmitting processor 457, the controller/processor 459, the memory 460 or the data source 467 is used to transmit the first signal in the first radio resource block in in the present disclosure.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first signaling; receives the first reference signal and the first signal, or, transmits the first reference signal and the first signal. Herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, the second communication device 450 comprises a memory that stores computer readable instruction program, the computer readable instruction program generates actions when executed by at least one processor, which include: receiving the first signaling; receives the first reference signal and the first signal, or, transmitting the first reference signal and the first signal. Herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first signaling; transmits the first reference signal and the first signal, or, receives the first reference signal and the first signal. Herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, the first communication device 410 comprises a memory that stores computer readable instruction program, the computer readable instruction program generates actions when executed by at least one processor, which include: transmitting the first signaling; transmitting the first reference signal and the first signal, or, receiving the first reference signal and the first signal. Herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, at least one of the antenna 452, the receiver 454, the receiving processor 456, the multi-antenna receiving processor 458, the controller/processor 459, the memory 460 or the data source 467 is used to receive the first reference signal and the first signal; at least one of the antenna 420, the transmitter 418, the transmitting processor 416, the multi-antenna transmitting processor 471, the controller/processor 475 or the memory 476 is used to transmit the first reference signal and the first signal.

In one embodiment, at least one of the antenna 420, the receiver 418, the receiving processor 470, the multi-antenna receiving processor 472, the controller/processor 475 or the memory 476 is used to receive the first reference signal and the first signal; at least one of the antenna 452, the transmitter 454, the transmitting processor 468, the multi-antenna transmitting processor 457, the controller/processor 459, the memory 460 or the data source 467 is used to transmit the first reference signal and the first signal.

In one embodiment, at least one of the antenna 420, the receiver 418, the receiving processor 470, the multi-antenna receiving processor 472, the controller/processor 475 or the memory 476 is used to receive the first information block; at least one of the antenna 452, the transmitter 454, the transmitting processor 468, the multi-antenna transmitting processor 457, the controller/processor 459, the memory 460 or the data source 467 is used to transmit the first information block.

In one embodiment, at least one of the antenna 452, the receiver 454, the receiving processor 456, the multi-antenna receiving processor 458, the controller/processor 459, the memory 460 or the data source 467 is used to receive the second information block; at least one of the antenna 420, the transmitter 418, the transmitting processor 416, the multi-antenna transmitting processor 471, the controller/ processor 475 or the memory 476 is used to transmit the second information block.

Embodiment 5

Embodiment 5 illustrates a flowchart of wireless transmission according to one embodiment of the present disclosure, as shown in FIG. 5. In FIG. 5, a second node U1 and a first node U2 are communication nodes in transmission via an air interface. In FIG. 5, steps marked by a box F51 and F52 are optional, respectively, and steps in either the box F51 or the box F52 are to be implemented.

The second node U1 transmits a first information block in step S5101; transmits a second signaling in step S511; transmits a third signal in step S5102; and transmits a first signaling in step S512; transmits a second signal in step S5103; and receives a first signal in a first radio resource block in step S513.

The first node U2 receives a first information block in step S5201; receives a second signaling in step S521; receives a third signal in step S5202; and receives a first signaling in step S522; receives a second signal in step S5203; and transmits a first signal in a first radio resource block in step S523.

In Embodiment 5, the first signaling is used by the first node U2 for determining the first radio resource block; the first signal carries a first bit block and a second bit block, with the first bit block being associated with the first signaling, a third bit block is associated with the second signaling, and the third bit block is used by the first node U2 for generating the second bit block; a number of bits comprised in the first bit block is used by the first node U2 for determining a first resource size, and a second resource size is used by the first node U2 for determining a size of a time-frequency resource occupied by the first signal, the first resource size being used by the first node U2 for determining the second resource size; the second resource size is used by the first node U2 for determining a number of bits comprised in the second bit block; the first resource size and the second resource size are positive integers, respectively.

In one embodiment, the first node U2 is the first node in the present disclosure.

In one embodiment, the second node U1 is the second node in the present disclosure.

In one embodiment, an air interface between the second node U1 and the first node U2 comprises a wireless interface between a base station and a UE.

In one embodiment, an air interface between the second node U1 and the first node U2 comprises a wireless interface between UEs.

In one embodiment, a number of bits comprised in the first bit block is used by the second node U1 for determining the first resource size, the second resource size is used by the second node U1 for determining a size of a time-frequency resource occupied by the first signal, and the first resource size is used by the second node U1 for determining the second resource size; the second resource size is used by the second node U1 for determining a number of bits comprised in the second bit block.

In one embodiment, the first signaling is transmitted on a downlink physical layer control channel (i.e., a downlink channel only capable of carrying a physical layer signaling).

In one embodiment, the first signaling is transmitted on a Physical Downlink Control Channel (PDCCH).

In one embodiment, the first signaling is transmitted on a Physical Sidelink Control Channel (PSCCH).

In one embodiment, the first signaling is transmitted on a downlink physical layer data channel (i.e., a downlink channel capable of carrying physical layer data).

In one embodiment, the first signaling is transmitted on a Physical Downlink Shared CHannel (PDSCH).

In one embodiment, the first signaling is transmitted on a Physical Sidelink Shared Channel (PSSCH).

In one embodiment, the second signaling is transmitted on a downlink physical layer control channel (i.e., a downlink channel only capable of carrying a physical layer signaling).

In one embodiment, the second signaling is transmitted on a PDCCH.

In one embodiment, the second signaling is transmitted on a PSCCH.

In one embodiment, the second signaling is transmitted on a downlink physical layer data channel (i.e., a downlink channel capable of carrying physical layer data).

In one embodiment, the second signaling is transmitted on a PDSCH.

In one embodiment, the second signaling is transmitted on a PSSCH.

In one embodiment, the first signal is transmitted on an uplink physical layer control channel (i.e., an uplink channel only capable of carrying a physical layer signaling).

In one embodiment, the first signal is transmitted on a Physical Uplink Control CHannel (PUCCH).

In one embodiment, the first signal is transmitted on a Physical Uplink Shared CHannel (PUSCH).

In one embodiment, the first signal is transmitted on a Physical Sidelink Feedback Channel (PSFCH).

In one embodiment, steps in the box F51 illustrated by the FIG. 5 exist.

In one embodiment, the first information block comprises configuration information of the first radio resource block.

In one embodiment, the configuration information of the first radio resource block comprises one or more of a time-domain resource occupied, a frequency-domain resource occupied, a code-domain resource occupied, a modulation mode, a low Peak-to-Average Power Ratio (PAPR) sequence, a pseudo-random sequence, a cyclic shift, an Orthogonal Cover Code (OCC), an orthogonal sequence, a maximum code rate, a maximum payload size, or a PUCCH format.

In one embodiment, the first information block is carried by a higher layer signaling.

In one embodiment, the first information block is carried by an RRC signaling.

In one embodiment, the first information block is carried by a MAC CE signaling.

In one embodiment, the first information block comprises a positive integer number of information bit(s).

In one embodiment, the first information block comprises information in all or part of fields of an Information Element (IE).

In one embodiment, the first information block comprises information in all or part of fields of a PUCCH-Config IE.

In one embodiment, the first information block comprises all or part of information in a resource SetToAddModList field of a PUCCH-Config IE.

In one embodiment, the first information block comprises all or part of information in a resourceToAddModList field of a PUCCH-Config IE.

In one embodiment, steps in the box F52 illustrated by the FIG. 5 exist.

In one embodiment, the second signaling is used to determine configuration information of the third signal, the third signal being used to generate the third bit block.

In one embodiment, the second signaling explicitly indicates the configuration information of the third signal.

In one embodiment, the second signaling implicitly indicates the configuration information of the third signal.

In one embodiment, the configuration information of the third signal comprises one or more of a time-domain resource occupied, a frequency-domain resource occupied, a Modulation and Coding Scheme (MCS), DMRS configuration information, a HARQ process number, a Redundancy Version (RV) or a New Data Indicator (NDI).

In one embodiment, the configuration information of the third signal comprises one or more of a time-domain resource occupied, a frequency-domain resource occupied, a code-domain resource occupied, a Reference Signal (RS) sequence, a mapping mode, a cyclic shift, an OCC or a number of repetitions.

In one embodiment, the phrase that a third bit block is associated with the second signaling means that the second signaling is used to determine configuration information of the third signal, the third signal being used to generate the third bit block.

In one embodiment, the phrase that a third bit block is associated with the second signaling means that the second signaling comprises configuration information of the third signal, the third bit block indicates whether a bit block carried by the third signal is correctly received, and the bit block carried by the third signal is a Transport Block (TB), a Code Block (CB) or a Code Block Group (CBG).

In one embodiment, the phrase that a third bit block is associated with the second signaling means that the second signaling comprises configuration information of the third signal, the third signal comprises a reference signal, and a measurement on the third signal is used to generate the third bit block, the third bit block comprising CSI.

In one embodiment, the phrase that a third bit block is associated with the second signaling means that the second signaling is used to trigger transmission of the third signal, the third signal comprises a reference signal, and a measurement on the third signal is used to generate the third bit block, the third bit block comprising CSI.

In one embodiment, the reference signal comprises a Channel State Information-Reference Signal (CSI-RS).

In one embodiment, the reference signal comprises a Synchronisation Signal/physical broadcast channel Block (SSB).

In one embodiment, the third signal is a baseband signal.

In one embodiment, the third signal is a radio signal.

In one embodiment, the third signal is a radio frequency signal.

In one embodiment, the third signal is transmitted on a PDSCH.

In one embodiment, the third signal is transmitted on a Physical Broadcast Channel (PBCH).

In one embodiment, steps in the box F53 illustrated by the FIG. 5 exist.

In one embodiment, the first signaling is used to determine configuration information of the second signal, the second signal being used to generate the first bit block.

In one embodiment, the first signaling explicitly indicates the configuration information of the second signal.

In one embodiment, the first signaling implicitly indicates the configuration information of the second signal.

In one embodiment, the configuration information of the second signal comprises one or more of a time-domain resource occupied, a frequency-domain resource occupied, an MCS, DMRS configuration information, a HARQ process number, an RV or an NDI.

In one embodiment, the configuration information of the second signal comprises one or more of a time-domain resource occupied, a frequency-domain resource occupied, a code-domain resource occupied, an RS sequence, a mapping mode, a cyclic shift, an OCC or a number of repetitions.

In one embodiment, the phrase of the first bit block being associated with the first signaling means that the first signaling is used to determine configuration information of the second signal, the second signal being used to generate the first bit block.

In one embodiment, the phrase of the first bit block being associated with the first signaling means that the first signaling comprises configuration information of the second signal, and the first bit block indicates whether a bit block carried by the second signal is correctly received, and the bit block carried by the second signal is a TB, a CB or a CBG.

In one embodiment, the phrase of the first bit block being associated with the first signaling means that the first signaling comprises configuration information of the second signal, the second signal comprises a reference signal, and a measurement on the second signal is used to generate the first bit block, the first bit block comprising CSI.

In one embodiment, the phrase of the first bit block being associated with the first signaling means that the first signaling is used to trigger transmission of the second signal, the second signal comprises a reference signal, and a measurement on the second signal is used to generate the first bit block, the first bit block comprising CSI.

In one embodiment, the second signal is a baseband signal.

In one embodiment, the second signal is a radio signal.

In one embodiment, the second signal is a radio frequency signal.

In one embodiment, the second signal is transmitted on a PDSCH.

In one embodiment, the second signal is transmitted on a PBCH.

In one embodiment, an end time of a time-domain resource occupied by the second signal is earlier than a start time of a time-domain resource occupied by the third signal.

In one embodiment, an end time of a time-domain resource occupied by the third signal is earlier than a start time of a time-domain resource occupied by the second signal.

In one embodiment, the third signal and the second signal are overlapping in time domain.

Embodiment 6

Embodiment 6 illustrates a schematic diagram of a given radio resource block according to one embodiment of the present disclosure; as shown in FIG. 6. In Embodiment 6, the given radio resource block is the first radio resource block or the second radio resource block.

In one embodiment, the given radio resource block is the first radio resource block.

In one embodiment, the given radio resource block is the second radio resource block.

In one embodiment, the given radio resource block comprises a time-domain resource and a frequency-domain resource.

In one embodiment, the given radio resource block comprises a time-frequency resource, a frequency-domain resource and a code-domain resource.

In one embodiment, the code-domain resource comprises one or more of a DMRS port, a DMRS CDM group, a pseudo-random sequence, a Zadoff-Chu sequence, a low PAPR sequence, a cyclic shift, an OCC, an orthogonal sequence, a frequency-domain orthogonal sequence or a time-domain orthogonal sequence.

In one embodiment, the given radio resource block comprises a positive integer number of RE(s) in time-frequency domain.

In one embodiment, an RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the given radio resource block comprises a positive integer number of subcarrier(s) in frequency domain.

In one embodiment, the given radio resource block comprises a positive integer number of PRB(s) in frequency domain.

In one embodiment, the given radio resource block comprises a positive integer number of consecutive PRBs in frequency domain.

In one embodiment, the given radio resource block comprises a positive integer number of non-consecutive PRBs in frequency domain.

In one embodiment, the given radio resource block comprises a positive integer number of multicarrier symbol(s) in time domain.

In one embodiment, the given radio resource block comprises a positive integer number of consecutive multicarrier symbols in time domain.

In one embodiment, the given radio resource block comprises a positive integer number of non-consecutive multicarrier symbols in time domain.

In one embodiment, the given radio resource block comprises a positive integer number of slot(s) in time domain.

In one embodiment, the given radio resource block comprises a positive integer number of sub-frame(s) in time domain.

In one embodiment, the first radio resource block comprises a PUCCH resource.

In one embodiment, the first radio resource block is a PUCCH resource.

In one embodiment, the first radio resource block comprises a PUCCH resource set.

In one embodiment, the first radio resource block is a PUCCH resource set.

In one embodiment, a PUCCH format corresponding to the first radio resource block includes PUCCH-format2.

In one embodiment, a PUCCH format corresponding to the first radio resource block includes PUCCH-format3.

In one embodiment, the second radio resource block comprises a PUCCH resource.

In one embodiment, the second radio resource block is a PUCCH resource.

In one embodiment, the second radio resource block comprises a PUCCH resource set.

In one embodiment, the second radio resource block is a PUCCH resource set.

In one embodiment, the first radio resource block and the second radio resource block are totally overlapping in time domain.

In one embodiment, the first radio resource block and the second radio resource block are partially overlapping in time domain.

Embodiment 7

Embodiment 7 illustrates a schematic diagram of a first signaling being used to determine a first radio resource block according to one embodiment of the present disclosure; as shown in FIG. 7.

In one embodiment, the first signaling indicates the first radio resource block.

In one embodiment, the first signaling explicitly indicates the first radio resource block.

In one embodiment, the first signaling implicitly indicates the first radio resource block.

In one embodiment, a time-frequency resource occupied by the first signaling is used to determine the first radio resource block.

In one embodiment, the first signaling indicates that the first radio resource block is reserved for the first bit block.

In one embodiment, the first signaling indicates that the first radio resource block is reserved for the first bit block and the second bit block.

In one embodiment, the first signaling indicates that the first radio resource block is reserved for UCI.

In one embodiment, the first signaling indicates that the first radio resource block is reserved for transmission of the first bit block.

In one embodiment, the first signaling indicates that the first radio resource block is reserved for transmissions of the first bit block and the second bit block.

In one embodiment, the number of bits comprised in the first bit block and the number of bits comprised in the second bit block are used to determine a first radio resource block set, the first radio resource block set comprising a positive integer number of radio resource block(s), and the first radio resource block being a radio resource block in the first radio resource block set; the first signaling indicates the first radio resource block out of the first radio resource block set.

In one subembodiment, a third field of the first signaling indicates the first radio resource block out of the first radio resource block set.

In one subembodiment, a third field of the first signaling and a time-frequency resource occupied by the first signaling jointly indicate the first radio resource block out of the first radio resource block set.

In one subembodiment, the third field of the first signaling comprises all or part of information in a PUCCH resource indicator field.

In one subembodiment, the first radio resource block set comprises a PUCCH resource set.

In one subembodiment, the first radio resource block set is a PUCCH resource set.

In one subembodiment, any radio resource block in the first radio resource block set is a PUCCH resource.

In one embodiment, a sum of the number of bits comprised in the first bit block and the number of bits comprised in the second bit block is equal to K0; the first radio resource block set is one of M1 candidate radio resource block sets, M1 being a positive integer greater than 1; the M1 candidate radio resource block sets respectively correspond to M1 first-type integers, the M1 first-type integers respectively being M1 mutually unequal positive integers; a first integer is a smallest first-type integer among the M1 first-type integers that is no less than the K0, and the first radio resource block set is a candidate radio resource block set corresponding to the first integer among the M1 candidate radio resource block sets.

In one subembodiment, any of the M1 candidate radio resource block sets is a PUCCH resource set.

In one subembodiment, the M1 first-type integers are respectively maximum payload sizes corresponding to the M1 candidate radio resource block sets.

Embodiment 8

Embodiment 8 illustrates a schematic diagram of a third bit block being used to generate a second bit block according to one embodiment of the present disclosure; as shown in FIG. 8.

In one embodiment, the third bit block is used to generate part or all of bits comprised in the second bit block.

In one embodiment, the second bit block comprises all or part of bits in the third bit block.

In one embodiment, the second bit block only comprises part of bits in the third bit block.

In one embodiment, the second bit block comprises all bits in the third bit block.

In one embodiment, a given bit is a bit in the second bit block, and the given bit is generated by S1 bits in the third bit block, S1 being a positive integer greater than 1.

In one subembodiment, the given bit is any bit in the second bit block.

In one subembodiment, the given bit is obtained by the 51 bits through logic AND operation.

In one subembodiment, the given bit is obtained by the 51 bits through logic OR operation.

In one subembodiment, the given bit is obtained by the 51 bits through exclusive OR (XOR) operation.

In one subembodiment, among the S1 bits if there is a bit equal to NACK, the given bit is equal to NACK; if each of the S1 bits is equal to ACK, the given bit is equal to ACK.

In one embodiment, the second bit block comprises a first bit sub-block and a second bit sub-block, and a CRC bit block of the first bit sub-block is used for generating the second bit sub-block.

In one subembodiment, the second bit sub-block is a CRC bit block of the first bit sub-block.

In one subembodiment, the second bit sub-block is obtained by scrambling a CRC bit block of the first bit sub-block.

In one subembodiment, the given bit is any bit in the first bit sub-block.

Embodiment 9

Embodiment 9 illustrates a schematic diagram of a second signaling being used to determine a second radio resource block according to one embodiment of the present disclosure; as shown in FIG. 9.

In one embodiment, the second signaling is used by the first node for determining the second radio resource block.

In one embodiment, the second signaling indicates the second radio resource block.

In one embodiment, the second signaling explicitly indicates the second radio resource block.

In one embodiment, the second signaling implicitly indicates the second radio resource block.

In one embodiment, a time-frequency resource occupied by the second signaling is used for determining the second radio resource block.

In one embodiment, the number of bits comprised in the third bit block is used to determine a second radio resource block set, the second radio resource block set comprising a positive integer number of radio resource block(s), and the second radio resource block being a radio resource block in the second radio resource block set; the second signaling indicates the second radio resource block out of the second radio resource block set.

In one subembodiment, a third field of the second signaling indicates the second radio resource block out of the second radio resource block set.

In one subembodiment, a third field of the second signaling and a time-frequency resource occupied by the second signaling jointly indicate the second radio resource block out of the second radio resource block set.

In one subembodiment, the second radio resource block set is a PUCCH resource set.

In one subembodiment, any radio resource block in the second radio resource block set is a PUCCH resource.

In one embodiment, the number of bits comprised in the third bit block is equal to K3; the second radio resource block set is one of M2 candidate radio resource block sets, M2 being a positive integer greater than 1; the M2 candidate radio resource block sets respectively correspond to M2 first-type integers, the M2 first-type integers respectively being M2 mutually unequal positive integers; a second integer is a smallest first-type integer no less than the K3 among the M2 first-type integers, the second radio resource block set corresponding to the second integer.

In one subembodiment, any of the M2 candidate radio resource block sets is a PUCCH resource set.

In one subembodiment, the M2 first-type integers are respectively maximum payload sizes corresponding to the M2 candidate radio resource block sets.

In one embodiment, the phrase of the second radio resource block being reserved for the third bit block means that the second radio resource block is reserved for transmission of the third bit block.

In one embodiment, the phrase of the second radio resource block being reserved for the third bit block means that the second radio resource block is reserved for transmission of a radio signal generated by the third bit block.

In one embodiment, the phrase of the second radio resource block being reserved for the third bit block means that the second radio resource block cannot be used for transmitting a radio signal other than a radio signal generated by the third bit block.

In one embodiment, the first node drops transmitting a radio signal in the second radio resource block.

In one embodiment, the first node drops transmitting the third bit block in the second radio resource block.

Embodiment 10

Embodiment 10 illustrates a schematic diagram of a number of bits comprised in a first bit block being used to determine a first resource size according to one embodiment of the present disclosure; as shown in FIG. 10. In Embodiment 10, the number of bits comprised in the first bit block and the first code rate are jointly used for determining the first resource size.

In one embodiment, the number of bits comprised in the first bit block and the first code rate are used by the first node for determining the first resource size.

In one embodiment, the number of bits comprised in the first bit block and the first code rate are used by the second node for determining the first resource size.

In one embodiment, the first code rate is a coding rate.

In one embodiment, the first code rate is a channel coding rate.

In one embodiment, the channel coding comprises a Polar code.

In one embodiment, the channel coding comprises coding in 3GPP TS38.212, section 5.3.3.3.

In one embodiment, the channel coding comprises a Low density parity check (LDPC) code.

In one embodiment, the first code rate is a positive real number no greater than 1.

In one embodiment, the first code rate is configured by a higher layer signaling.

In one embodiment, the first code rate is configured by an RRC signaling.

In one embodiment, the first information block indicates the first code rate.

In one embodiment, the first code rate is indicated by a higher-layer parameter maxCodeRate.

In one embodiment, the phrase of the first radio resource block corresponding to the first code rate means that the first code rate is a maximum code rate corresponding to the first radio resource block.

In one embodiment, the phrase of the first radio resource block corresponding to the first code rate means that the first code rate is a maximum code rate corresponding to a payload transmitted in the first radio resource block.

In one embodiment, the phrase of the first radio resource block corresponding to the first code rate means that a code rate corresponding to a payload transmitted in the first radio resource block cannot be greater than the first code rate.

In one embodiment, the phrase of the first radio resource block corresponding to the first code rate means that the configuration information of the first radio resource block comprises the first code rate.

In one embodiment, the first resource size refers to a size of a time-frequency resource required when the first bit block is transmitted employing a modulation scheme corresponding to the first signal and a code rate no greater than the first code rate.

In one embodiment, the first resource size refers to a number of REs required when the first bit block is transmitted employing a modulation scheme corresponding to the first signal and a code rate no greater than the first code rate.

In one embodiment, the first resource size refers to a number of PRBs required when the first bit block is transmitted employing a modulation scheme corresponding to the first signal and a code rate no greater than the first code rate.

In one embodiment, the modulation scheme corresponding to the first signal includes pi/2-BPSK.

In one embodiment, the modulation scheme corresponding to the first signal includes QPSK.

In one embodiment, the modulation scheme corresponding to the first signal is configured by an RRC signaling.

In one embodiment, the modulation scheme corresponding to the first signal is configured by the first information block.

In one embodiment, a value obtained by a product of the first resource size and the first code rate further multiplied by a modulation order of the first signal is no less than the number of bits comprised in the first bit block.

In one embodiment, the first resource size is obtained by the number of bits comprised in the first bit block being divided by a product of a modulation order of the first signal and the first code rate and then rounded up to a nearest integer.

In one embodiment, the modulation order of the first signal is either 1 or 2.

In one embodiment, if the modulation scheme corresponding to the first signal is pi/2-BPSK, the modulation order of the first signal is equal to 1; if the modulation scheme corresponding to the first signal is QPSK, the modulation order of the first signal is equal to 2.

Embodiment 11

Embodiment 11 illustrates a schematic diagram of a number of bits comprised in a first bit block being used to determine a first resource size according to one embodiment of the present disclosure; as shown in FIG. 11. In Embodiment 11, the first resource size is one of P1 candidate resource sizes, P1 being a positive integer greater than 1; the first resource size is a minimum candidate resource size in a first candidate resource size subset, the first candidate resource size subset comprising a positive integer number of candidate resource size(s) of the P1 candidate resource sizes; any candidate resource size in the first candidate resource size subset multiplied by a first value is no less than the number of bits comprised in the first bit block; the first value is a positive real number, and the first value is linear with the first code rate.

In one embodiment, the P1 candidate resource sizes are respectively P1 mutually unequal positive integers.

In one embodiment, any of the P1 candidate resource sizes is no greater than the first resource size threshold.

In one embodiment, the P1 is equal to the first resource size threshold, and the P1 candidate resource sizes are equal to 1 . . . , and the first resource size threshold, respectively.

In one embodiment, the first candidate resource size subset only comprises one candidate resource size.

In one embodiment, the first candidate resource size subset comprises multiple candidate resource sizes.

In one embodiment, any candidate resource size in the first candidate resource size subset is equal to a non-negative integral power of 2 multiplied by a non-negative integral power of 3 and further multiplied by a non-negative integral power of 5.

In one embodiment, the first value is equal to a second value multiplied first by a third value, and then by a fourth value and the first code rate; the second value is related to a number of subcarriers comprised by a PRB, the third value is related to a number of multicarrier symbols occupied by the first radio resource block, and the fourth value is a modulation order corresponding to the first signal.

In one subembodiment, the third value is equal to a number of multicarrier symbols occupied by the first radio resource block.

In one subembodiment, the third value is equal to a number of multicarrier symbols occupied by the first radio resource block being subtracted by a number of multicarrier symbols used for transmitting DMRS.

In one subembodiment, the second value is equal to a first parameter minus 4.

In one subembodiment, the second value is equal to a first parameter being divided by a second parameter.

In one subembodiment, the second value is equal to a first parameter minus 4 and then being divided by a second parameter.

In one subembodiment, the first parameter is a number of subcarriers comprised by a PRB.

In one subembodiment, the first parameter is equal to 12.

In one subembodiment, the second parameter is configured by an RRC signaling.

In one embodiment, a product of the first resource size minus 1 and the first value is less than the number of bits comprised in the first bit block.

Embodiment 12

Embodiment 12 illustrates a schematic diagram of a second resource size being used to determine a number of bits comprised in a second bit block according to one embodiment of the present disclosure; as shown in FIG. 12. In Embodiment 12, the second resource size and the first code rate are jointly used to determine K2, K2 being a positive integer greater than 1; the number of bits comprised in the second bit block is no greater than K2 being subtracted by the number of bits comprised in the first bit block.

In one embodiment, the number of bits comprised in the second bit block is equal to K2 being subtracted by the number of bits comprised in the first bit block.

In one embodiment, the number of bits comprised in the second bit block is less than K2 being subtracted by the number of bits comprised in the first bit block.

In one embodiment, the second resource size and the first code rate are jointly used to determine the number of bits comprised in the second bit block.

In one embodiment, the second resource size, the first code rate and the number of bits comprised in the first bit block are jointly used to determine the number of bits comprised in the second bit block.

In one embodiment, the K2 is no greater than a product of the second resource size and the first value.

In one embodiment, the K2 is equal to a product of the second resource size and the first value being rounded down to a nearest integer.

In one embodiment, the K2 is equal to a product of the second resource size and the first value being rounded down to a nearest integer and then subtracted by a first CRC length; the first CRC length is a positive integer.

In one embodiment, the K2 is equal to a product of the second resource size and the first code rate being multiplied by a modulation order of the first signal and then being rounded down to a nearest integer.

In one embodiment, the K2 is equal to a product of the second resource size and the first code rate being multiplied by a modulation order of the first signal and then being rounded down to a nearest integer and subtracted by a first CRC length; the first CRC length is a positive integer.

In one embodiment, the K2 is equal to the second resource size being subtracted by a number of REs used for transmitting DMRS, and then multiplied sequentially by the first code rate and a modulation order of the first signal, and the being rounded down to a nearest integer.

In one embodiment, the K2 is equal to the second resource size being subtracted by a number of REs used for transmitting DMRS, and then multiplied sequentially by the first code rate and a modulation order of the first signal, and the being rounded down to a nearest integer and further subtracted by a first CRC length.

In one embodiment, the first CRC length is equal to 6 or 11.

In one embodiment, the third bit block comprises W bit sub-blocks, W being a positive integer greater than 1; the W bit sub-blocks are sequentially arranged, and the second bit block comprises W1 bit sub-block(s) in the front of the W bit sub-blocks, W1 being a positive integer no greater than W; a total number of bits comprised in the W1 bit sub-block(s) is no greater than K2 minus the number of bits comprised in the first bit block.

In one subembodiment, the second bit block does not comprise any of the W bit sub-blocks not belonging to the W1 bit sub-block(s).

In one subembodiment, W1 is equal to W.

In one subembodiment, W1 is less than W.

In one subembodiment, the W bit sub-blocks respectively correspond to W priorities, and the W bit sub-blocks are sequentially arranged in a descending order in accordance with corresponding priorities.

In one subembodiment, the W bit sub-blocks respectively correspond to W priorities, and the W bit sub-blocks are sequentially arranged in an ascending order in accordance with corresponding priorities.

In one subembodiment, the W priorities are different from each other.

In one subembodiment, if the W1 is less than the W, a total number of bits comprised by (W1+1) bit sub-blocks is greater than K2 minus the number of bits comprised in the first bit block, the (W1+1) bit sub-blocks being frontmost (W1+1) bit sub-blocks among the W bit sub-blocks.

Embodiment 13

Embodiment 13 illustrates a schematic diagram of a ratio of a second resource size to a first resource size being no greater than a first threshold according to one embodiment of the present disclosure; as shown in FIG. 13.

In one embodiment, the second resource size being divided by the first resource size is no greater than the first threshold.

In one embodiment, a ratio of the second resource size to the first resource size is less than the first threshold.

In one embodiment, a ratio of the second resource size to the first resource size is equal to the first threshold.

In one embodiment, the first threshold is a positive real number.

In one embodiment, the first threshold is a positive real number no less than 1.

In one embodiment, the first threshold is equal to 1.

In one embodiment, the first threshold is greater than 0.

In one embodiment, the first threshold is configured by a higher layer signaling.

In one embodiment, the first threshold is configured by an RRC signaling.

In one embodiment, the first threshold is semi-statically configured.

In one embodiment, the first information block indicates the first threshold.

In one embodiment, the first resource size and the first threshold are used to determine a maximum value of the second resource size.

Embodiment 14

Embodiment 14 illustrates a schematic diagram of a first resource size being used to determine a second resource size according to one embodiment of the present disclosure; as shown in FIG. 14. In Embodiment 14, a sum of the number of bits comprised in the first bit block and the number of bits comprised in the third bit block is equal to K1, K1 being a positive integer greater than 1, and K1 being used to determine a third resource size; a first reference resource size is equal to a product of the first resource size and the first threshold; the second resource size is no greater than a minimum value between the third resource size and the first reference resource size.

In one embodiment, the second resource size is equal to a minimum value between the third resource size and the first reference resource size.

In one embodiment, the second resource size is equal to a minimum value among the third resource size, the first reference resource size and the first resource size threshold.

In one embodiment, the third resource size is a smallest candidate resource size in a second candidate resource size subset; the second candidate resource size subset comprises a positive integer number of candidate resource size(s) of the P1 candidate resource sizes; a product of any candidate resource size in the second candidate resource size subset and the first value is no less than the K1.

In one subembodiment, the second candidate resource subset only comprises one candidate resource size.

In one subembodiment, the second candidate resource subset comprises multiple candidate resource sizes.

In one subembodiment, any candidate resource size in the second candidate resource subset is equal to a non-negative integral power of 2 multiplied by a non-negative integral power of 3 and further multiplied by a non-negative integral power of 5.

In one subembodiment, the third resource size minus 1 being multiplied by the first value is less than the K1.

In one embodiment, a value obtained by a product of the third resource size and the first code rate being multiplied by the modulation order of the first signal is no less than the K1.

In one embodiment, the third resource size is equal to K1 being divided by a product of the modulation order of the first signal and the first code rate and then rounded up to a nearest integer.

In one embodiment, the third resource size is a number of REs required when the first bit block and the third bit block are transmitted employing a modulation scheme corresponding to the first signal and a code rate no greater than the first code rate.

In one embodiment, the third resource size is a number of PRBs required when the first bit block and the third bit block are transmitted employing a modulation scheme corresponding to the first signal and a code rate no greater than the first code rate.

Embodiment 15

Embodiment 15 illustrates a schematic diagram of a difference between a second resource size and a first resource size being no greater than a second threshold according to one embodiment of the present disclosure; as shown in FIG. 15.

In one embodiment, the second resource size being subtracted by the first resource size is no greater than the second threshold.

In one embodiment, a difference between the second resource size and the first resource size is less than the second threshold.

In one embodiment, a difference between the second resource size and the first resource size is equal to the second threshold.

In one embodiment, the second threshold is measured in a same unit as the first resource size.

In one embodiment, the second threshold is a non-negative integer.

In one embodiment, the second threshold is equal to 0, and the second resource size is equal to the first resource size.

In one embodiment, the second threshold is greater than 0.

In one embodiment, the second threshold is configured by a higher layer signaling.

In one embodiment, the second threshold is configured by an RRC signaling.

In one embodiment, the first information block indicates the second threshold.

In one embodiment, the first resource size and the second threshold are used to determine a maximum value of the second resource size.

In one embodiment, the second radio resource block is used to determine the second threshold.

In one embodiment, a second resource size threshold is used to determine the second threshold.

In one embodiment, the second resource size threshold is a positive integer.

In one embodiment, the second resource size threshold is measured in RE.

In one embodiment, the second resource size threshold is measured in PRB.

In one embodiment, a number of PRBs occupied by the second radio resource block is no greater than the second resource size threshold.

In one embodiment, a number of REs occupied by the second radio resource block is no greater than the second resource size threshold.

In one embodiment, the second resource size threshold is configured by an RRC signaling.

In one embodiment, the second resource size threshold is configured by a higher layer signaling.

In one embodiment, the second threshold is equal to the second resource size threshold.

In one embodiment, the second threshold is equal to the second resource size threshold divided by a number of multicarrier symbols occupied by the first radio resource block and then divided by 12.

In one embodiment, the second threshold is equal to the second resource size threshold multiplied by a number of multicarrier symbols occupied by the second radio resource block and then divided by a number of multicarrier symbols occupied by the first radio resource block and rounded to a nearest integer.

Embodiment 16

Embodiment 16 illustrates a schematic diagram of a first resource size being used to determine a second resource size according to one embodiment of the present disclosure; as shown in FIG. 16. In Embodiment 16, a sum of the number of bits comprised in the first bit block and the number of bits comprised in the third bit block is equal to K1, K1 being a positive integer greater than 1, and K1 being used to determine a third resource size; a second reference resource size is equal to a sum of the first resource size and the second threshold; the second resource size is no greater than a minimum value between the third resource size and the second reference resource size.

In one embodiment, the second resource size is equal to a minimum value between the third resource size and the second reference resource size.

In one embodiment, the second resource size is equal to a minimum value among the third resource size, the second reference resource size and the first resource size threshold.

Embodiment 17

Embodiment 17 illustrates a schematic diagram of a number of bits comprised in a third bit block and a second code rate being used to determine a second threshold according to one embodiment of the present disclosure; as shown in FIG. 17. In Embodiment 17, the number of bits comprised in the third bit block and the second code rate are used to determine a fourth resource size, the fourth resource size being used to determine the second threshold.

In one embodiment, a number of bits comprised in the third bit block and the second code rate are used by the first node for determining the second threshold.

In one embodiment, a number of bits comprised in the third bit block and the second code rate are used by the second node for determining the second threshold.

In one embodiment, the second threshold is equal to the fourth resource size.

In one embodiment, the second threshold is equal to a product of the fourth resource size and a number of multicarrier symbols occupied by the second radio resource block further multiplied by 12.

In one embodiment, the second threshold is equal to the fourth resource size being multiplied by a number of multicarrier symbols occupied by the second radio resource block, divided by a number of multicarrier symbols occupied by the first radio resource block and then rounded to a nearest integer.

In one embodiment, the fourth resource size is measured in RE.

In one embodiment, the fourth resource size is measured in PRB.

In one embodiment, a fourth resource size is a smallest candidate resource size in a fourth candidate resource size subset, the fourth candidate resource size subset comprising a positive integer number of candidate resource size(s); any candidate resource size in the fourth candidate resource size subset is a positive integer, and a product of any candidate resource size in the fourth candidate resource size subset and a fifth value is no less than the number of bits comprised in the third bit block; the fifth value is a positive real number, and the fifth value is linear with the second code rate.

In one subembodiment, when the fourth candidate resource size subset comprises multiple candidate resource sizes, the multiple candidate resource sizes are mutually unequal.

In one subembodiment, any candidate resource size in the fourth candidate resource size subset is no greater than the second resource size threshold.

In one subembodiment, the fifth value is equal to a sixth value multiplied by a seventh value and then by an eighth value and the second code rate; the sixth value is related to a number of subcarriers comprised in a PRB, the seventh value is related to a number of multicarrier symbols occupied by the second radio resource block, and the eighth value is a modulation order corresponding to the second radio resource block.

In one embodiment, the fourth resource size is a number of REs required when the third bit block is transmitted employing a modulation scheme corresponding to the second radio resource block and a code rate no greater than the second code rate.

In one embodiment, the fourth resource size is a number of PRBs required when the third bit block is transmitted employing a modulation scheme corresponding to the second radio resource block and a code rate no greater than the second code rate.

In one embodiment, a modulation scheme corresponding to the second radio resource block is pi/2-BPSK or QPSK.

In one embodiment, the fourth resource size is equal to the number of bits comprised in the third bit block being divided by a product of a modulation order corresponding to the second radio resource block and the second code rate and then being rounded up to a nearest integer.

In one embodiment, the second code rate is a coding rate.

In one embodiment, the second code rate is a channel coding rate.

In one embodiment, the second code rate is a positive real number no greater than 1.

In one embodiment, the second code rate is greater than the first code rate.

In one embodiment, the second code rate is less than the first code rate.

In one embodiment, the second code rate is equal to the first code rate.

In one embodiment, the second code rate is configured by a higher layer signaling.

In one embodiment, the second code rate is configured by an RRC signaling.

In one embodiment, the second code rate is indicated by a higher-layer parameter maxCodeRate.

In one embodiment, the second radio resource block corresponds to the second code rate.

In one embodiment, the second code rate is a maximum code rate corresponding to the second radio resource block.

In one embodiment, the second code rate is a maximum code rate corresponding to a payload transmitted in the second radio resource block.

In one embodiment, a code rate corresponding to a payload transmitted in the second radio resource block is no greater than the second code rate.

Embodiment 18

Embodiment 18 illustrates a schematic diagram of a first priority and a second priority according to one embodiment of the present disclosure; as shown in FIG. 18. In Embodiment 18, the first signaling indicates the first priority, while the second signaling indicates the second priority.

In one embodiment, the first signaling explicitly indicates the first priority.

In one embodiment, the first signaling implicitly indicates the first priority.

In one embodiment, the first signaling comprises a first field, and the first field of the first signaling indicates the first priority.

In one embodiment, the second signaling explicitly indicates the second priority.

In one embodiment, the second signaling implicitly indicates the second priority.

In one embodiment, the second signaling comprises a first field, and the first field of the second signaling indicates the second priority.

In one embodiment, the first field comprises all or part of information in a Priority indicator field.

In one embodiment, the first field comprises one bit.

In one embodiment, the first priority is a non-negative integer.

In one embodiment, the second priority is a non-negative integer.

In one embodiment, the first priority is 0 or 1.

In one embodiment, the second priority is 0 or 1.

In one embodiment, the first priority is equal to 0, and the second priority is equal to 1.

In one embodiment, the first priority is equal to 1, and the second priority is equal to 0.

In one embodiment, the first priority is higher than the second priority.

In one embodiment, the first bit block corresponds to the first priority, while the third bit block corresponds to the second priority.

In one embodiment, the first signaling indicates that the first bit block corresponds to the first priority.

In one embodiment, the first signaling indicates that the second signal corresponds to the first priority.

In one embodiment, the second signaling indicates that the third bit block corresponds to the second priority.

In one embodiment, the second signaling indicates that the third signal corresponds to the second priority.

Embodiment 19

Embodiment 19 illustrates a structure block diagram of a processing device in a first node according to one embodiment of the present disclosure; as shown in FIG. 19. In FIG. 19, a processing device 1900 in a first node comprises a first receiver 1901 and a first transmitter 1902.

In Embodiment 19, the first receiver 1901 receives a first signaling and a second signaling; the first transmitter 1902 transmits a first signal in a first radio resource block.

In Embodiment 19, the first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

In one embodiment, the first receiver 1901 receives a second signal; herein, the first signaling is used to determine configuration information of the second signal, the second signal being used to generate the first bit block.

In one embodiment, the first receiver 1901 receives a third signal; herein, the second signaling is used to determine configuration information of the third signal, the third signal being used to generate the third bit block.

In one embodiment, the first receiver 1901 receives a first information block; herein, the first information block comprises configuration information of the first radio resource block.

In one embodiment, the second signaling is used to determine a second radio resource block, the second radio resource block being reserved for the third bit block; the first radio resource block and the second radio resource block are overlapping in time domain.

In one embodiment, the number of bits comprised in the first bit block and a first code rate are used to determine the first resource size, and the first radio resource block corresponds to the first code rate.

In one embodiment, a ratio of the second resource size to the first resource size is no greater than a first threshold.

In one embodiment, a difference between the second resource size and the first resource size is no greater than a second threshold.

In one embodiment, a number of bits comprised in the third bit block and a second code rate are used to determine the second threshold.

In one embodiment, the first signaling indicates a first priority, while the second signaling indicates a second priority; the first priority is different from the second priority.

In one embodiment, the first node is a UE.

In one embodiment, the first node is a relay node.

In one embodiment, the first receiver 1901 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1902 comprises at least one of the antenna 452, the transmitter 454, the transmitting processor 468, the multi-antenna transmitting processor 457, the controller/processor 459, the memory 460 or the data source 467 in Embodiment 4.

Embodiment 20

Embodiment 20 illustrates a structure block diagram of a processing device in a second node according to one embodiment of the present disclosure; as shown in FIG. 20. In FIG. 20, a processing device 2000 in a second node comprises a second transmitter 2001 and a second receiver 2002.

In Embodiment 20, the second transmitter 2001 transmits a first signaling and a second signaling; the second receiver 2002 receives a first signal in a first radio resource block.

In Embodiment 20, the first signaling is used to determine the first radio resource block; the first signal carries a first bit block and a second bit block, with the first bit block being associated with the first signaling, a third bit block is associated with the second signaling, and the third bit block is used to generate the second bit block; a number of bits comprised in the first bit block is used to determine a first resource size, and a second resource size is used to determine a size of a time-frequency resource occupied by the first signal, the first resource size being used to determine the second resource size; the second resource size is used to determine a number of bits comprised in the second bit block; the first resource size and the second resource size are positive integers, respectively.

In one embodiment, the second transmitter 2001 transmits a second signal; herein, the first signaling is used to determine configuration information of the second signal, the second signal being used to generate the first bit block.

In one embodiment, the second transmitter 2001 transmits a third signal; herein, the second signaling is used to determine configuration information of the third signal, the third signal being used to generate the third bit block.

In one embodiment, the second transmitter 2001 transmits a first information block; herein, the first information block comprises configuration information of the first radio resource block.

In one embodiment, the second signaling is used to determine a second radio resource block, the second radio resource block being reserved for the third bit block; the first radio resource block and the second radio resource block are overlapping in time domain.

In one embodiment, the number of bits comprised in the first bit block and a first code rate are used to determine the first resource size, and the first radio resource block corresponds to the first code rate.

In one embodiment, a ratio of the second resource size to the first resource size is no greater than a first threshold.

In one embodiment, a difference between the second resource size and the first resource size is no greater than a second threshold.

In one embodiment, a number of bits comprised in the third bit block and a second code rate are used to determine the second threshold.

In one embodiment, the first signaling indicates a first priority, while the second signaling indicates a second priority; the first priority is different from the second priority.

In one embodiment, the second node is a base station.

In one embodiment, the second node is a UE.

In one embodiment, the second node is a relay node.

In one embodiment, the second transmitter 2001 comprises at least one of the antenna 420, the transmitter 418, the transmitting processor 416, the multi-antenna transmitting processor 471, the controller/processor 475 or the memory 476 in Embodiment 4.

In one embodiment, the second receiver 2002 comprises at least one of the antenna 420, the receiver 418, the receiving processor 470, the multi-antenna receiving processor 472, the controller/processor 475 or the memory 476 in Embodiment 4.

Embodiment 21

Embodiment 21 illustrates a schematic diagram of size of a time-frequency resource occupied by a first signal according to one embodiment of the present disclosure; as shown in FIG. 21. In Embodiment 21, a sum of the number of bits comprised in the first bit block and the number of bits comprised in the second bit block is equal to K0, K0 being a positive integer greater than 1; K0 is used to determine a size of a time-frequency resource occupied by the first signal.

In one embodiment, the K0 is used to determine a number of REs occupied by the first signal.

In one embodiment, the K0 is used to determine a number of PRBs occupied by the first signal.

In one embodiment, the K0 is used together with the first code rate for determining a size of a time-frequency resource occupied by the first signal.

In one embodiment, the K0 is used together with the first code rate for determining a number of REs occupied by the first signal.

In one embodiment, the K0 is used together with the first code rate for determining a number of PRBs occupied by the first signal.

In one embodiment, a number of PRBs occupied by the first signal is equal to a smallest candidate resource size in a third candidate resource size subset, the third candidate resource size subset comprising a positive integer number of candidate resource size(s) of the P1 candidate resource sizes; a product of any candidate resource size in the third candidate resource size subset and the first value is no less than the K0.

In one embodiment, the third candidate resource size subset only comprises one candidate resource size.

In one embodiment, the third candidate resource size subset comprises one candidate resource size.

In one embodiment, any candidate resource size in the third candidate resource size subset is equal to a non-negative integral power of 2 multiplied by a non-negative integral power of 3 and further multiplied by a non-negative integral power of 5.

In one embodiment, a product of a number of PRBs occupied by the first signal minus 1 and the first value is less than the K0.

Embodiment 22

Embodiment 22 illustrates a flowchart of a first signaling, a first reference signal and a first signal according to one embodiment of the present disclosure, as shown in FIG. 22. In 2200 illustrated by FIG. 22, each box represents a step. Particularly, the sequence of steps marked by different boxes does not necessarily represent specific chronological orders of respective steps.

In Embodiment 22, the first node in the present disclosure receives a first signaling in step 2201; receives a first reference signal and a first signal in step 2202, or, transmits a first reference signal and a first signal. Herein, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, the first node receives the first reference signal and the first signal.

In one embodiment, the first node transmits the first reference signal and the first signal.

In one embodiment, the first signaling comprises a higher layer signaling.

In one embodiment, the first signaling comprises an RRC signaling.

In one embodiment, the first signaling comprises a MAC CE signaling.

In one embodiment, the first signaling comprises a dynamic signaling.

In one embodiment, the first signaling comprises an L1 signaling.

In one embodiment, the first signaling comprises an L1 control signaling.

In one embodiment, the first signaling comprises DCI.

In one embodiment, the first signaling comprises one or more fields of a piece of DCI.

In one embodiment, the first signaling comprises one or more fields of a piece of SCI.

In one embodiment, the first signaling comprises DCI used for DownLink Grant.

In one embodiment, the first signaling comprises DCI used for UpLink Grant.

In one embodiment, the first signaling comprises DCI used for activation of Downlink Semi-Persistent Scheduling Assignment.

In one embodiment, the first signaling comprises DCI used for activation of Configured Uplink Grant Type 2.

In one embodiment, the first signaling is transmitted in DownLink.

In one embodiment, the first signaling is transmitted in SideLink.

In one embodiment, the first signaling is used to determine the first reference signal.

In one embodiment, the first reference signal comprises a Channel State Information-Reference Signal (CSI-RS).

In one embodiment, the first reference signal comprises a Synchronisation Signal/physical broadcast channel Block (SSB).

In one embodiment, the first reference signal comprises DeModulation Reference Signals (DMRS).

In one embodiment, the first reference signal comprises a Sounding Reference Signal (SRS).

In one embodiment, the first reference signal is periodic.

In one embodiment, the first reference signal is semi-persistent.

In one embodiment, the first reference signal is aperiodic.

In one embodiment, the first reference signal occurs only once in time domain.

In one embodiment, the first reference signal occurs multiple times in time domain.

In one embodiment, the first reference signal occurs at even intervals in time domain.

In one embodiment, the first reference signal occurs at uneven intervals in time domain.

In one embodiment, the first reference signal occurs periodically in time domain.

In one embodiment, a measurement on the first reference signal is used by a transmitter of the first signal for determining a Tx parameter of the first signal, the Tx parameter comprising one or more of a Modulation and Coding Scheme (MCS), a transmission antenna port, a number of DMRS ports, a Transmission Configuration Indicator (TCI) state, a precoding matrix or Layer number.

In one embodiment, the first signal comprises a baseband signal.

In one embodiment, the first signal comprises a radio signal.

In one embodiment, the first signal comprises a radio frequency signal.

In one embodiment, the first signal carries a bit block, the bit block being a TB or a CB, or, a CBG.

In one embodiment, the first signal is dynamically scheduled.

In one embodiment, the first signal is dynamically scheduled by a piece of DCI.

In one embodiment, the first signal is a Semi-Persistent Scheduling-based transmission.

In one embodiment, the first signal is a Semi-Persistent Scheduling (SPS)-based downlink transmission.

In one embodiment, the first signal is a Configured Grant-based uplink transmission.

In one embodiment, the first signal is an uplink transmission based on Configured Grant Type 2.

In one embodiment, the first signal occurs only once in time domain.

In one embodiment, the first signal occurs multiple times in time domain.

In one embodiment, the first signal occurs at even intervals in time domain.

In one embodiment, the first signal occurs at uneven intervals in time domain.

In one embodiment, the first signal occurs periodically in time domain.

In one embodiment, the scheduling information of the first signal comprises one or more of a time-domain resource occupied, a frequency-domain resource occupied, an MCS, DMRS configuration information, a HARQ process number, an RV or an NDI.

In one embodiment, the first reference signal and the first signal belong to a same serving cell in frequency domain.

In one embodiment, the first reference signal and the first signal belong to a same Bandwidth part (BWP) in frequency domain.

In one embodiment, the first signaling explicitly indicates the first information unit.

In one embodiment, the first signaling implicitly indicates the first information unit.

In one embodiment, the first signaling indicates an identifier of the first information unit.

In one embodiment, the identifier of the first information unit comprises a CSI-ReportConfigId.

In one embodiment, the identifier of the first information unit comprises an SRS-ResourceSetId.

In one embodiment, the first signaling comprises a second field, and the second field of the first signaling indicates the first information unit.

In one subembodiment, the second field comprises all or part of information in an SRS request field.

In one subembodiment, the second field comprises all or part of information in a CSI request field.

In one embodiment, the first information unit comprises information in all or part of fields of an IE.

In one embodiment, the first information unit is an IE.

In one embodiment, the first information unit comprises information in all or part of fields of a CSI-ReportConfig IE.

In one embodiment, the first information unit is a CSI-ReportConfig IE.

In one embodiment, the first information unit comprises information in all or part of fields of an SRS-Resource Set IE.

In one embodiment, the first information unit is an SRS-ResourceSet IE.

In one embodiment, the first information unit corresponds to a first-type index, and the first signaling indicates the first-type index corresponding to the first information unit; the first-type index is a non-negative integer.

In one subembodiment, the first-type index comprises a codepoint of a CSI request field.

In one subembodiment, the first-type index comprises a codepoint of an SRS request field.

In one subembodiment, the first-type index comprises an aperiodicSRS-ResourceTrigger.

In one subembodiment, the first-type index comprises (a) value(s) comprised in an aperiodic SRS-ResourceTriggerList.

In one embodiment, the first information unit explicitly indicates the first reference signal.

In one embodiment, the first information unit implicitly indicates the first reference signal.

In one embodiment, the first information unit indicates an identifier of the first reference signal.

In one embodiment, the identifier of the first reference signal includes NZP-CSI-RS-ResourceId, NZP-CSI-RS-ResourceSetId, SSB-Index, SRS-ResourceSetId, SRS-ResourceId or BWP-Id.

In one embodiment, the first information unit is used to determine configuration information of the first reference signal.

In one embodiment, the first information unit indicates configuration information of the first reference signal.

In one embodiment, the configuration information of the first reference signal comprises one or more of a time-domain resource, a frequency-domain resource, a code-domain resource, a number of Reference Signal (RS) ports, an RS sequence, a cyclic shift, density, a Phase-Tracking Reference Signal (PTRS) port index, scrambling, a power offset, a TCI state, spatial-relation information or a number of repetitions.

In one embodiment, the first information unit indicates a radio resource occupied by the first reference signal.

In one embodiment, the first information unit explicitly indicates a radio resource occupied by the first reference signal.

In one embodiment, the first information unit implicitly indicates a radio resource occupied by the first reference signal.

In one embodiment, the radio resource comprises a time-domain resource and a frequency-domain resource.

In one embodiment, the radio resource comprises a time-domain resource, a frequency-domain resource and a code-domain resource.

In one embodiment, the code-domain resource comprises one or more of a DMRS port, a DMRS CDM group, a pseudo-random sequence, a Zadoff-Chu sequence, a low Peak-to-Average Power Ratio (PAPR) sequence, a cyclic shift, an Orthogonal Cover Code (OCC), an orthogonal sequence, a frequency-domain orthogonal sequence or a time-domain orthogonal sequence.

In one embodiment, the first information unit indicates a frequency-domain resource occupied by the first reference signal.

In one embodiment, the first information unit indicates a code-domain resource occupied by the first reference signal.

In one embodiment, the first information unit and the first signaling are jointly used to determine a time-domain resource occupied by the first reference signal.

In one embodiment, a time-domain resource occupied by the first signaling and the first information unit are jointly used to determine a time-domain resource occupied by the first reference signal.

In one embodiment, the first information unit indicates a first cycle and a first offset, a time-domain resource occupied by the first signaling and the first offset are jointly used to determine a time-domain resource occupied by the first reference signal when occurring for the first time in time domain, and the first cycle is used to determine a time interval between any two adjacent occurrences of the first reference signal in time domain.

In one embodiment, the first signaling explicitly indicates the first index.

In one embodiment, the first signaling implicitly indicates the first index.

In one embodiment, the first signaling comprises a third field, and the third field of the first signaling indicates the first index.

In one subembodiment, the third field comprises all or part of information in a Transmission configuration indication field.

In one subembodiment, the third field comprises all or part of information in an SRS resource indicator field.

In one embodiment, a time-frequency resource occupied by the first signaling is used to determine the first index.

In one embodiment, a DCI format of the first signaling is used to determine the first index.

In one embodiment, the first index is a non-negative integer.

In one embodiment, the first index comprises a codepoint of a TCI field.

In one embodiment, the first index comprises a TCI-StateId.

In one embodiment, the first index comprises an SRS Resource Indicator (SRI).

In one embodiment, the first index comprises a codepoint of an SRI field.

In one embodiment, the first index comprises an SRS-ResourceId.

In one embodiment, the first index comprises an SRS-ResourceSetId.

In one embodiment, the first information indicates that the first index is used by the first node for determining a spatial relation of the first reference signal, or, the first information indicates that the first index is not used by the first node for determining the spatial relation of the first reference signal.

In one embodiment, the first signaling indicates the first information.

In one embodiment, the first signaling explicitly indicates the first information.

In one embodiment, the first signaling implicitly indicates the first information.

In one embodiment, a time-frequency resource occupied by the first signaling is used to determine the first information.

In one embodiment, a serving cell to which the first signaling belongs is used to determine the first information.

In one embodiment, a BWP to which the first signaling belongs is used to determine the first information.

In one embodiment, a format of the first signaling is used to determine the first information.

In one embodiment, a format of the first signaling belongs to a first format set, the first format set comprising DCI format 0_0, DCI format 0_1, DCI format 0_2, DCI format 1_0, DCI format 1_1, DCI format 12, DCI format 20, DCI format 2_1, DCI format 2_2, DCI format 23, DCI format 24, DCI format 2_5 and DCI format 2_6.

In one embodiment, if the format of the first signaling belongs to a first format subset, the first information indicates that the first index is used for determining a spatial relation of the first reference signal; if the format of the first signaling belongs to a second format subset, the first information indicates that the first index is not used for determining a spatial relation of the first reference signal, the first format subset and the second format subset respectively comprise some formats in the first format set, and there isn't any format belonging to the first format subset and the second format subset simultaneously.

In one embodiment, a signaling identifier of the first signaling is used to determine the first information.

In one embodiment, a signaling identifier of the first signaling belongs to a first identifier set, the first identifier set comprising a Cell-Radio Network Temporary Identifier (C-RNTI), a Configured Scheduling (CS)-RNTI, a Semi-persistent (SP)-CSI-RNTI and an MCS-C-RNTI.

In one embodiment, if the signaling identifier of the first signaling belongs to a first identifier subset, the first information indicates that the first index is used for determining a spatial relation of the first reference signal; if the signaling identifier of the first signaling belongs to a second identifier subset, the first information indicates that the first index is not used for determining a spatial relation of the first reference signal, the first identifier subset and the second identifier subset respectively comprise some signaling identifiers in the first identifier set, and there isn't any signaling identifier belonging to the first identifier subset and the second identifier subset simultaneously.

Embodiment 23

Embodiment 23 illustrates a flowchart of wireless transmission according to one embodiment of the present disclosure, as shown in FIG. 23. In FIG. 23, a second node U3 and a first node U4 are communication nodes in transmission via an air interface. In FIG. 23, steps marked by the box F231 and the box F232 are optional, respectively.

The second node U3 transmits a second information block in step S23301; transmits a first signaling in step S2331; and transmits a first reference signal in step S2332; receives a first information block in step S23302; and transmits a first signal in step S2333.

The first node U4 receives a second information block in step S23401; receives a first signaling in step S2341; and receives a first reference signal in step S2342; transmits a first information block in step S23402; and receives a first signal in step S2343.

In Embodiment 23, the first signaling comprises scheduling information of the first signal; the first signaling indicates a first information unit, the first information unit being used by the first node U4 to determine the first reference signal; the first signaling is used by the first node U4 to determine a first index, the first index being used by the first node U4 to determine a spatial relation of the first signal; first information is used by the first node U4 to determine whether the first index is used for determining a spatial relation of the first reference signal, and the first signaling is used by the first node U4 to determine the first information.

In one embodiment, the first node U4 is the first node in the present disclosure.

In one embodiment, the second node U3 is the second node in the present disclosure.

In one embodiment, an air interface between the second node U3 and the first node U4 comprises a wireless interface between a base station and a UE.

In one embodiment, an air interface between the second node U3 and the first node U4 comprises a wireless interface between UEs.

In one embodiment, the first reference signal is earlier than the first signal in time domain.

In one embodiment, the first reference signal is later than the first signal in time domain.

In one embodiment, the first reference signal and the first signal occur alternately in time domain.

In one embodiment, the first information block is earlier than the first signal in time domain.

In one embodiment, the first information block is later than the first signal in time domain.

In one embodiment, the first information block and the first signal occur alternately in time domain.

In one embodiment, the first reference signal is earlier than the first information block in time domain.

In one embodiment, the first reference signal is later than the first information block in time domain.

In one embodiment, the first information block and the first reference signal occur alternately in time domain.

In one embodiment, the first signaling is transmitted on a downlink physical layer control channel (i.e., a downlink channel only capable of carrying a physical layer signaling).

In one embodiment, the first signaling is transmitted on a Physical Downlink Control Channel (PDCCH).

In one embodiment, the first signaling is transmitted on a Physical Sidelink Control Channel (PSCCH).

In one embodiment, the first signaling is transmitted on a downlink physical layer data channel (i.e., a downlink channel capable of carrying physical layer data).

In one embodiment, the first signaling is transmitted on a Physical Downlink Shared CHannel (PDSCH).

In one embodiment, the first signaling is transmitted on a Physical Sidelink Shared Channel (PSSCH).

In one embodiment, the first signal is transmitted on a downlink physical layer data channel (i.e., a downlink channel capable of carrying physical layer data).

In one embodiment, the first signal is transmitted on a PDSCH.

In one embodiment, the first signal is transmitted on multiple PDSCHs.

In one embodiment, the first signal is transmitted on a PSSCH.

In one embodiment, steps marked by the box F231 in FIG. 23 exist; the second information block indicates a second index; when the first information is used to determine that the first index is not used for determining a spatial relation of the first reference signal, the second index is used by the first node U4 for determining the spatial relation of the first reference signal.

In one embodiment, the second information block is transmitted on a PDSCH.

In one embodiment, the second information block is transmitted on a PSSCH.

In one embodiment, steps marked by the box F231 in FIG. 23 do not exist.

In one embodiment, steps marked by the box F232 in FIG. 23 exist; a measurement on the first reference signal is used to determine the first information block.

In one embodiment, the first information block is transmitted on a Physical Uplink Control CHannel (PUCCH).

In one embodiment, the first information block is transmitted on multiple PUCCHs.

In one embodiment, the first information block is transmitted on a Physical Uplink Shared CHannel (PUSCH).

In one embodiment, the first information block is transmitted on multiple PUSCHs.

Embodiment 24

Embodiment 24 illustrates a flowchart of wireless transmission according to one embodiment of the present disclosure, as shown in FIG. 24. In FIG. 24, a second node U5 and a first node U6 are communication nodes in transmission via an air interface. In FIG. 24, steps in the box F241 are optional.

The second node U5 transmits a second information block in step S24501; transmits a first signaling in step S2451; receives a first signal in step S2452; and receives a first reference signal in step S2453.

The first node U6 receives a second information block in step S24601; receives a first signaling in step S2461; transmits a first signal in step S2462; and transmits a first reference signal in step S2463.

In Embodiment 24, the first signaling comprises scheduling information of the first signal; the first signaling indicates a first information unit, the first information unit being used by the first node U6 to determine the first reference signal; the first signaling is used by the first node U6 to determine a first index, the first index being used by the first node U6 to determine a spatial relation of the first signal; first information is used by the first node U6 to determine whether the first index is used for determining a spatial relation of the first reference signal, and the first signaling is used by the first node U6 to determine the first information.

In one embodiment, the first signal is transmitted on an uplink physical layer data channel (i.e., an uplink channel capable of carrying physical layer data).

In one embodiment, the first signal is transmitted on a PUSCH.

In one embodiment, the first signal is transmitted on multiple PUSCHs.

Embodiment 25

Embodiment 25 illustrates a schematic diagram of a first index being used to determine a spatial relation of a first signal according to one embodiment of the present disclosure; as shown in FIG. 25. In Embodiment 25, the first index is used to determine a second reference signal, and the second reference signal is used to determine a spatial relation of the first signal.

In one embodiment, the first index indicates the second reference signal.

In one embodiment, the first index is an identifier of the second reference signal.

In one embodiment, the second reference signal comprises K sub-reference-signals, K being a positive integer greater than 1; the first index is used to determine each of the K sub-reference-signals.

In one subembodiment, the first index indicates each of the K sub-reference-signals.

In one subembodiment, the first index is used to determine an identifier of each of the K sub-reference-signals.

In one embodiment, the first index indicates a second information unit, the second information unit indicating the second reference signal.

In one subembodiment, the second information unit comprises information in all or part of fields of an IE.

In one subembodiment, the second information unit is an IE.

In one subembodiment, the second information unit comprises information in all or part of fields of a TCI-State IE.

In one subembodiment, the second information unit is a TCI-State IE.

In one subembodiment, the second information unit comprises information in all or part of fields of an SRS-Resource Set IE.

In one subembodiment, the second information unit comprises information in all or part of fields of an SRS-Resource IE.

In one subembodiment, the second information unit indicates an identifier of the second reference signal.

In one embodiment, the second reference signal comprises a CSI-RS.

In one embodiment, the second reference signal comprises an SSB.

In one embodiment, the second reference signal comprises an SRS.

In one embodiment, an identifier of the second reference signal includes NZP-CSI-RS-ResourceId, NZP-CSI-RS-ResourceSetId, SSB-Index, SRS-ResourceSetId, SRS-ResourceId or BWP-Id.

In one embodiment, the spatial relation comprises a TCI state.

In one embodiment, the spatial relation comprises Quasi co-location (QCL) assumption.

In one embodiment, the spatial relation comprises a QCL parameter.

In one embodiment, the spatial relation comprises a spatial setting.

In one embodiment, the spatial relation comprises a Spatial Relation.

In one embodiment, the spatial relation comprises an SRI.

In one embodiment, the spatial relation comprises precoding.

In one embodiment, the spatial relation comprises a Rank.

In one embodiment, the spatial relation comprises a spatial domain filter.

In one embodiment, the spatial relation comprises a spatial domain transmission filter.

In one embodiment, the spatial relation comprises a spatial domain receive filter.

In one embodiment, the spatial relation comprises a Spatial Tx parameter.

In one embodiment, the spatial relation comprises a Spatial Rx parameter.

In one embodiment, the spatial relation comprises large-scale properties.

In one embodiment, the large-scale properties comprise one or more of delay spread, Doppler spread, Doppler shift, an average delay or a Spatial Rx parameter.

In one embodiment, the phrase that the second reference signal is used to determine a spatial relation of the first signal means that large-scale properties of a channel that the first signal goes through can be inferred from large-scale properties of a channel that the second reference signal goes through.

In one embodiment, the phrase that the second reference signal is used to determine a spatial relation of the first signal means that a spatial domain filter corresponding to the second reference signal is used to determine a spatial domain filter of the first signal.

In one embodiment, the phrase that the second reference signal is used to determine a spatial relation of the first signal means that the first node employs a same spatial domain filter to receive the second reference signal and the first signal.

In one embodiment, the phrase that the second reference signal is used to determine a spatial relation of the first signal means that the first node employs a same spatial domain filter to receive the second reference signal and transmit the first signal.

In one embodiment, the phrase that the second reference signal is used to determine a spatial relation of the first signal means that the first node employs a same spatial domain filter to transmit the second reference signal and the first signal.

In one embodiment, the phrase that the second reference signal is used to determine a spatial relation of the first signal means that the first node employs a same spatial domain filter to transmit the second reference signal and receive the first signal.

In one embodiment, the phrase that the second reference signal is used to determine a spatial relation of the first signal means that a DMRS port of the first signal is QCL with a transmission antenna port of the second reference signal.

In one embodiment, the phrase that the second reference signal is used to determine a spatial relation of the first signal means that a DMRS port of the first signal is QCL with a transmission antenna port of the second reference signal, with a corresponding QCL type being QCL-TypeD.

In one embodiment, the phrase that the second reference signal is used to determine a spatial relation of the first signal means that precoding of the second reference signal is used to determine precoding of the first signal.

In one embodiment, the phrase that the second reference signal is used to determine a spatial relation of the first signal means that the first signal and the second reference signal employ the same precoding.

In one embodiment, the phrase that the second reference signal is used to determine a spatial relation of the first signal means that a transmission antenna port of the second reference signal is used to determine a transmission antenna port of the first signal.

In one embodiment, the phrase that the second reference signal is used to determine a spatial relation of the first signal means that the first signal and the second reference signal are transmitted by a same antenna port.

In one embodiment, the second reference signal comprises K sub-reference-signals, and the first signal comprises K sub-signals, K being a positive integer greater than 1; precodings employed by the K sub-signals are respectively the same as those employed by the K sub-reference-signals.

In one embodiment, the second reference signal comprises K sub-reference-signals, and the first signal comprises K sub-signals, K being a positive integer greater than 1; the K sub-signals are respectively transmitted by same antenna ports as the K sub-reference-signals.

In one embodiment, the first index indicates a TCI state corresponding to the first signal.

In one embodiment, the first index is a TCI state ID of a TCI state corresponding to the first signal.

In one embodiment, the first index indicates QCL assumption of the first signal.

In one embodiment, if the first index is used to determine a spatial relation of the first reference signal, the second reference signal is used to determine a spatial relation of the first reference signal.

In one embodiment, if the first index is not used to determine a spatial relation of the first reference signal, a spatial relation of the first reference signal is unrelated to the second reference signal.

Embodiment 26

Embodiment 26 illustrates a schematic diagram of a first priority being used to determine first information according to one embodiment of the present disclosure; as shown in FIG. 26. In Embodiment 26, the first signaling is used by the first node for determining the first priority, and the first priority is used by the first node for determining the first information.

In one embodiment, the first signaling explicitly indicates the first priority.

In one embodiment, the first signaling implicitly indicates the first priority.

In one embodiment, a format of the first signaling is used to determine the first priority.

In one embodiment, the first signaling comprises a fourth field, and the fourth field of the first signaling indicates the first priority.

In one subembodiment, the fourth field comprises information in a Priority indicator field.

In one embodiment, the first signaling indicates a priority index for the first priority.

In one embodiment, the first priority comprises information in a Priority indicator field.

In one embodiment, the first priority is a non-negative integer.

In one embodiment, the first priority is 0 or 1.

In one embodiment, a priority index for the first priority is a non-negative integer.

In one embodiment, a priority index for the first priority is 0 or 1.

In one embodiment, a priority of the first signal is the first priority.

In one embodiment, the first node receives the first signal; the first priority is used to determine a HARQ-ACK codebook corresponding to the first signal.

In one embodiment, if the first priority belongs to a first priority set, the first information indicates that the first index is used for determining a spatial relation of the first reference signal; if the first priority does not belong to a first priority set, the first information indicates that the first index is not used for determining a spatial relation of the first reference signal.

In one embodiment, the first priority set comprises a positive integer number of priority (priorities).

In one embodiment, any priority comprised in the first priority set is higher than any priority not belonging to the first priority set.

In one embodiment, any priority comprised in the first priority set is lower than any priority not belonging to the first priority set.

In one embodiment, if a priority index for the first priority is equal to a first value, the first information indicates that the first index is used for determining a spatial relation of the first reference signal; if a priority index for the first priority is equal to a second value, the first information indicates that the first index is not used for determining a spatial relation of the first reference signal; the first value and the second value are respectively non-negative integers, and the first value is unequal to the second value.

In one embodiment, the first value is equal to 1, and the second value is equal to 0.

In one embodiment, the first value is equal to 0, and the second value is equal to 1.

In one embodiment, the priority of the first signal in the case of the first priority being equal to the first value is higher than that in the case of the first priority being equal to the second value.

Embodiment 27

Embodiment 27 illustrates a schematic diagram of a first MCS index set being used to determine first information according to one embodiment of the present disclosure; as shown in FIG. 27. In Embodiment 27, the first signaling is used to determine the first MCS index set, the first MCS index set being used to determine the first information.

In one embodiment, the first MCS index set is used by the first node for determining the first information.

In one embodiment, the first signaling comprises a fifth field, and the fifth field of the first signaling indicates the first MCS index from the first MCS index set.

In one subembodiment, the fifth field comprises information in a Modulation and coding scheme field.

In one embodiment, the first MCS index indicates an MCS of the first signal.

In one embodiment, the phrase that the first MCS index is applied to the first signal means that an MCS indicated by the first MCS index is applied to the first signal.

In one embodiment, an MCS of the first signal comprises a modulation order of the first signal and a target code rate of the first signal.

In one embodiment, the first MCS index set comprises multiple MCS indexes; any MCS index in the first MCS index set indicates a modulation order, a target code rate and a spectral efficiency.

In one embodiment, the first MCS index set is one of M candidate MCS index sets, M being a positive integer greater than 1.

In one embodiment, any one of the M candidate MCS index sets comprises multiple lines in Table 5.1.3.1-1, Table 5.1.3.1-2, Table 5.1.3.1-3, Table 6.1.4.1-1 or Table 6.1.4.1-2 provided in 3GPP 38.214 (V16.0.0).

In one embodiment, a format of the first signaling is used to determine the first MCS index set.

In one embodiment, a signaling identifier of the first signaling is used to determine the first MCS index set.

In one embodiment, a format and a first signaling identifier of the first signaling are jointly used to determine the first MCS index set.

In one embodiment, a BWP to which the first signaling belongs is used to determine the first MCS index set.

In one embodiment, a BWP to which the first signaling belongs is a first BWP, and the first node is configured with a third parameter for the first BWP, the third parameter being used to determine the first MCS index set.

In one subembodiment, the third parameter only takes effect on the first BWP.

In one subembodiment, the format of the first signaling and the third parameter are jointly used to determine the first MCS index set.

In one subembodiment, the signaling identifier of the first signaling and the third parameter are jointly used to determine the first MCS index set.

In one subembodiment, the third parameter is a higher layer parameter.

In one subembodiment, the third parameter comprises information carried by at least one of higher layer parameters mcs-Table, mcs-Table-For DCIFormat1_2, mcs-Table-ForDCIFormat0_2, mcs-Table TransformPrec oder or mcs-TableTransformPrecoder-ForDCIFormat02.

In one embodiment, if the first MCS index set belongs to a first MCS index set group, the first information indicates that the first index is used for determining a spatial relation of the first reference signal; if the first MCS index set does not belong to the first MCS index set group, the first information indicates that the first index is not used for determining a spatial relation of the first reference signal.

In one embodiment, the first MCS index set group comprises a positive integer number of MCS index set(s).

In one embodiment, the first MCS index set group comprises some of the M candidate MCS index sets.

In one embodiment, there is an MCS index set in the first MCS index set group that comprises multiple lines in a Table 5.1.3.1-3 provided in 3GPP 38.214 (V16.0.0).

In one embodiment, there is an MCS index set in the first MCS index set group that comprises multiple lines in a Table 6.1.4.1-2 provided in 3GPP 38.214 (V16.0.0).

In one embodiment, if the first MCS index set belongs to either Table 5.1.3.1-3 or Table 6.1.4.1-2 in 3GPP 38.214 (V16.0.0), the first information indicates that the first index is used for determining a spatial relation of the first reference signal; if the first MCS index set belongs to neither Table 5.1.3.1-3 nor Table 6.1.4.1-2 in 3GPP 38.214 (V16.0.0), the first information indicates that the first index is not used for determining a spatial relation of the first reference signal.

Embodiment 28

Embodiment 28 illustrates a schematic diagram of a time-domain behavior of a first reference signal being used to determine first information according to one embodiment of the present disclosure.

In one embodiment, the time-domain behavior of the first reference signal is used by the first node for determining the first information.

In one embodiment, the time-domain behavior refers to time domain behavior.

In one embodiment, the time-domain behavior includes periodic behavior, semi-persistent behavior and aperiodic behavior.

In one embodiment, the time-domain behavior of the first reference signal is indicated by a higher layer parameter resourceType.

In one embodiment, the time-domain behavior of the first reference signal is indicated by a higher layer parameter.

In one embodiment, the time-domain behavior of the first reference signal is related to the time-domain behavior of the first signal.

In one embodiment, the time-domain behavior of the first reference signal is periodic, semi-persistent or aperiodic.

In one embodiment, the time-domain behavior of the first signal is used to determine the time-domain behavior of the first reference signal.

In one embodiment, the time-domain behavior of the first reference signal is the same as the time-domain behavior of the first signal.

In one embodiment, if the time-domain behavior of the first signal is semi-persistent, the time-domain behavior of the first reference signal is also semi-persistent.

In one embodiment, if the time-domain behavior of the first signal is semi-persistent, the time-domain behavior of the first reference signal is semi-persistent or periodic.

In one embodiment, if the time-domain behavior of the first signal is aperiodic, the time-domain behavior of the first reference signal is also aperiodic.

In one embodiment, if the time-domain behavior of the first signal is aperiodic, the time-domain behavior of the first reference signal is aperiodic or semi-persistent.

In one embodiment, if the time-domain behavior of the first signal is aperiodic, the time-domain behavior of the first reference signal is aperiodic, semi-persistent or periodic.

In one embodiment, the first signaling is used to determine a time-domain behavior of the first signal.

In one embodiment, a signaling identifier of the first signaling is used to determine a time-domain behavior of the first signal.

In one embodiment, the time-domain behavior of the first signal is periodic, semi-persistent or aperiodic.

In one embodiment, if the signaling identifier of the first signaling belongs to a third identifier subset, the time-domain behavior of the first signal is aperiodic; if the signaling identifier of the first signaling belongs to a fourth identifier subset, the time-domain behavior of the first signal is semi-persistent; there isn't any signaling identifier belonging to the third identifier subset and the fourth identifier subset simultaneously.

In one embodiment, the third identifier subset comprises a C-RNTI.

In one embodiment, the fourth identifier subset comprises a CS-RNTI.

In one embodiment, the third identifier subset comprises an MCS-C-RNTI.

In one embodiment, if the time-domain behavior of the first reference signal belongs to a first behavior set, the first information indicates that the first index is used for determining a spatial relation of the first reference signal; if the time-domain behavior of the first reference signal does not belong to the first behavior set, the first information indicates that the first index is not used for determining the spatial relation of the first reference signal.

In one embodiment, the first behavior set includes periodic behavior set, semi-persistent behavior set and aperiodic behavior set.

In one embodiment, the first behavior set includes an aperiodic one.

In one embodiment, the first behavior set includes a semi-persistent one.

In one embodiment, the first behavior set does not include a semi-persistent one.

In one embodiment, the first behavior set does not include a periodic one.

In one embodiment, the first priority and the time-domain behavior of the first reference signal are jointly used to determine the first information.

In one embodiment, the first MCS index set and the time-domain behavior of the first reference signal are jointly used to determine the first information.

In one embodiment, a first condition set comprises multiple conditions, if each condition in the first condition set is fulfilled, the first information indicates that the first index is used for determining a spatial relation of the first reference signal; if one condition in the first condition set is not fulfilled, the first information indicates that the first index is not used for determining a spatial relation of the first reference signal.

In one embodiment, the first condition set comprises: the first priority belongs to a first priority set.

In one embodiment, the first condition set comprises: the first MCS index set belongs to a first MCS index set group.

In one embodiment, the first condition set comprises: the time-domain behavior of the first reference signal belongs to a first behavior set.

In one embodiment, the first condition set comprises: the format of the first signaling belongs to a first format subset.

In one embodiment, the first condition set comprises: the signaling identifier of the first signaling belongs to a first identifier set.

Embodiment 29

Embodiment 29 illustrates a schematic diagram of a first information block according to one embodiment of the present disclosure; as shown in FIG. 29. In Embodiment 29, a measurement on the first reference signal is used by the first node for determining the first information block.

In one embodiment, the first information block is carried by a physical layer signaling.

In one embodiment, the first information block is carried by a MAC CE signaling.

In one embodiment, the first information block comprises a positive integer number of information bit(s).

In one embodiment, the first information block comprises UCI.

In one embodiment, the first information block comprises HARQ-ACK information.

In one embodiment, the first information block comprises CSI.

In one embodiment, the first information block comprises a Channel Quality Indicator (CQI).

In one embodiment, the first information block comprises a Precoding Matrix Indicator (PMI).

In one embodiment, the priority of the first information block is the first priority.

In one embodiment, a measurement on the first reference signal is used to determine a CQI, and the first information block comprises the CQI.

In one embodiment, a measurement on the first reference signal is used to determine a first channel matrix, and the first channel matrix is used to determine the first information block.

In one embodiment, a Reference Signal Received Power (RSRP) of the first reference signal is used to determine the first information block.

In one embodiment, a channel measurement on the first reference signal is used to determine the first information block.

In one embodiment, an interference measurement on the first reference signal is used to determine the first information block.

In one embodiment, the first information block occurs only once in time domain.

In one embodiment, the first information block occurs multiple times in time domain.

In one embodiment, the first information block occurs at even intervals in time domain.

In one embodiment, the first information block occurs at uneven intervals in time domain.

In one embodiment, the first information block occurs periodically in time domain.

In one embodiment, the time-domain behavior of the first information block is related to the time-domain behavior of the first signal.

In one embodiment, the time-domain behavior of the first signal is used to determine the time-domain behavior of the first information block.

In one embodiment, the time-domain behavior of the first information block is the same as the time-domain behavior of the first signal.

In one embodiment, if the time-domain behavior of the first signal is semi-persistent, the time-domain behavior of the first information block is also persistent.

In one embodiment, if the time-domain behavior of the first signal is aperiodic, the time-domain behavior of the first information block is also aperiodic.

In one embodiment, the time-domain behavior of the first information block is periodic, semi-persistent or aperiodic.

In one embodiment, the time-domain behavior of the first reference signal is related to the time-domain behavior of the first information block.

In one embodiment, if the time-domain behavior of the first information block is semi-persistent, the time-domain behavior of the first reference signal is semi-persistent or periodic.

In one embodiment, if the time-domain behavior of the first information block is aperiodic, the time-domain behavior of the first reference signal is aperiodic, semi-persistent or periodic.

In one embodiment, the time-domain behavior of the first information block is indicated by a higher layer parameter reportConfigType.

In one embodiment, the time-domain behavior of the first information block is configured by a higher layer parameter.

In one embodiment, the first information unit indicates report setting information corresponding to the first information block.

In one embodiment, the report setting information corresponding to the first information block comprises one or more of content in the first information block, a radio resource occupied by the first information block, a time-domain behavior of the first information block, an identifier of the first reference signal or the first resource block.

In one embodiment, the content in the first information block comprises one or more of a CQI, RI, PMI, a CSI-RS Resource Indicator (CRI), a SSB Resource indicator (SSBRI), a Layer Indicator (LI), a Layer 1 (L1)-RSRP or a L1-Signal-to-noise and interference ratio (SINR).

In one embodiment, the first information unit explicitly indicates a radio resource occupied by the first information block.

In one embodiment, the first information unit implicitly indicates a radio resource occupied by the first information block.

In one embodiment, the first information unit indicates a frequency-domain resource occupied by the first information block.

In one embodiment, the first information unit indicates a code-domain resource occupied by the first information block.

In one embodiment, the first information unit and the first signaling are jointly used to determine a time-domain resource occupied by the first information block.

In one embodiment, a time-domain resource occupied by the first signaling and the first information unit are jointly used to determine a time-domain resource occupied by the first information block.

In one embodiment, the first information unit indicates a second cycle, and a time-domain resource occupied by the first signaling and a second offset are jointly used to determine a time-domain resource occupied by the first information block when occurring for the first time in time domain, and the second cycle is used to determine a time interval between any two adjacent occurrences of the first information block in time domain.

In one subembodiment, the first signaling indicates the second offset.

In one subembodiment, the first information unit indicates the second offset.

In one subembodiment, the first information unit indicates a first offset set, and the first signaling indicates the second offset out of the first offset set.

Embodiment 30

Embodiment 30 illustrates a schematic diagram of a first resource block according to one embodiment of the present disclosure; as shown in FIG. 30. In Embodiment 30, the first information block comprises the first channel quality, and the first resource block is a reference resource corresponding to the first channel quality.

In one embodiment, the first channel quality comprises a CQI.

In one embodiment, the first channel quality comprises a CQI index.

In one embodiment, the first channel quality comprises an L1-RSRP.

In one embodiment, the first channel quality comprises an L1-SINR.

In one embodiment, the first information block does not comprise any channel quality other than the first channel quality.

In one embodiment, a CSI Reporting Band corresponding to the first information block is located in a frequency-domain resource occupied by the first signal.

In one embodiment, the reference resource is a CSI reference resource.

In one embodiment, the first resource block comprises a positive integer number of RE(s).

In one embodiment, an RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first resource block comprises a positive integer number of multicarrier symbol(s) in time domain.

In one embodiment, the first resource block comprises a positive integer number of consecutive multicarrier symbols in time domain.

In one embodiment, the first resource block comprises a slot in time domain.

In one embodiment, the first resource block comprises a sub-frame in time domain.

In one embodiment, the first resource block comprises a positive integer number of subcarrier(s) in frequency domain.

In one embodiment, the first resource block comprises a positive integer number of PRB(s) in frequency domain.

In one embodiment, a first bit block is transmitted in the first resource block employing a transmission scheme corresponding to the first channel quality, and the first bit block can be received by the first node with a TB error probability not exceeding a first threshold.

In one embodiment, the transmission scheme corresponding to the first channel quality comprises one or more of a modulation scheme, a target code rate or a transport block size.

In one embodiment, the transmission scheme corresponding to the first channel quality comprises a modulation scheme, a target code rate and a transport block size.

In one embodiment, the first channel quality is a CQI index, and the first channel quality belongs to a first CQI index subset, the first CQI index subset comprising a positive integer number of CQI index(es); a first bit block is transmitted in the first resource block employing a transmission scheme corresponding to any CQI index in the first CQI index subset, and the first bit block can be received by the first node with a TB error probability not exceeding a first threshold; the first channel quality is a highest CQI index in the first CQI index subset.

In one embodiment, a transmission scheme corresponding to any CQI index in the first CQI index subset comprises a modulation scheme, a target code rate and a transport block size.

In one embodiment, the TB error probability refers to transport block error probability.

In one embodiment, the first threshold is a positive real number less than 1.

In one embodiment, the first threshold is 0.1.

In one embodiment, the first threshold is 0.00001.

In one embodiment, the first threshold is 0.000001.

In one embodiment, the first threshold is a positive real number no greater than 0.1 and no less than 0.000001.

Embodiment 31

Embodiment 31 illustrates a schematic diagram of a frequency-domain resource occupied by a first signal being used to determine a frequency-domain resource occupied by a first resource block according to one embodiment of the present disclosure; as shown in FIG. 31.

In one embodiment, a frequency-domain resource occupied by the first signal is used by the first node for determining a frequency-domain resource occupied by the first resource block.

In one embodiment, a frequency-domain resource occupied by the first reference signal is used to determine a frequency-domain resource occupied by the first resource block.

In one embodiment, the first resource block and the first reference signal belong to a same serving cell in frequency domain.

In one embodiment, the first resource block and the first reference signal belong to a same BWP in frequency domain.

In one embodiment, a frequency-domain resource occupied by the first resource block is located in a frequency-domain resource occupied by the first signal.

In one embodiment, the first resource block and the first signal occupy a same frequency-domain resource.

In one embodiment, the first resource block and the first signal belong to a same serving cell in frequency domain.

In one embodiment, the first resource block and the first signal belong to a BWP in frequency domain.

In one embodiment, the first information unit indicates a first frequency-domain zone, and a frequency-domain resource occupied by the first resource block is located in a frequency-domain resource occupied by the first signal that belongs to the first frequency-domain zone.

In one embodiment, the first channel quality is one of P channel qualities, and the first resource block is one of P resource blocks, P being a positive integer greater than 1; reference resources corresponding to the P channel qualities are the P resource blocks respectively.

In one embodiment, any of the P channel qualities comprises a CQI.

In one embodiment, any of the P channel qualities comprises a CQI index.

In one embodiment, any of the P channel qualities comprises an L1-RSRP.

In one embodiment, the first information block does not comprise any channel quality other than the P channel qualities.

In one embodiment, the first channel quality is any of the P channel qualities.

In one embodiment, the first information unit indicates P1 frequency-domain zones, P1 being a positive integer no less than the P; the P resource blocks respectively belong to P frequency-domain zones of the P1 frequency-domain zones in frequency domain.

In one subembodiment, any of the P frequency-domain zones is located in a frequency-domain resource occupied by the first signal.

In one subembodiment, any of the P frequency-domain zones is overlapping with a frequency-domain resource occupied by the first signal.

In one subembodiment, each of the P1 frequency-domain zones is located in a same BWP.

In one subembodiment, any of the P1 frequency-domain zones comprises a positive integer number of consecutive PRB(s).

In one embodiment, a time-domain resource occupied by the first information block is used to determine a time-domain resource occupied by the first resource block.

In one embodiment, the first resource block is located before a time-domain resource occupied by the first information block in time domain.

In one embodiment, the first resource block is located after a time-domain resource occupied by the first information block in time domain.

In one embodiment, the first resource block and the first information block belong to a same time unit in time domain.

In one embodiment, the first resource block and the first information block belong to different time units in time domain.

In one embodiment, the time unit comprises a positive integer number of consecutive multicarrier symbols.

In one embodiment, the time unit is a slot.

In one embodiment, the time unit is a sub-slot.

In one embodiment, the time unit is a sub-frame.

In one embodiment, the first resource block belongs to a target time unit in time domain, and a time unit occupied by the first information block is used to determine a reference time unit; a time interval between the target time unit and the reference time unit is a first interval; the first interval is a non-negative integer.

In one subembodiment, the reference time unit is a time unit to which the first information block belongs.

In one subembodiment, a time unit to which the first information block belongs is a time unit n1, and the reference time unit is a time unit n, the n being equal to a product of the n1 and a first ratio being rounded down to a nearest integer, and a subcarrier spacing configuration corresponding to the first reference signal and a subcarrier spacing configuration corresponding to the first information block are used to determine the first ratio.

In one subembodiment, the first interval is measured in the time unit.

In one subembodiment, the first interval is a minimum non-negative integer no less than a fifth value that enables the target time unit to be a time unit used by a transmitter of the first reference signal for transmitting a radio signal to the first node; the fifth value is a non-negative integer.

In one reference embodiment of the above subembodiment, the fifth value is related to a subcarrier spacing configuration corresponding to the first reference signal.

In one reference embodiment of the above subembodiment, the fifth value is related to a delay requirement.

Embodiment 32

Embodiment 32 illustrates a schematic diagram of a signaling identifier of a first signaling being used to determine a target information unit set according to one embodiment of the present disclosure; as shown in FIG. 32. In Embodiment 32, the target information unit set is the first information unit set or the second information unit set; a signaling identifier of the first signaling is used by the first node for determining the target information unit set from the first information unit set and the second information unit set.

In one embodiment, the first information unit set and the second information unit set respectively comprise a positive integer number of information unit(s).

In one embodiment, any unit set in the first information unit set comprises information in all or part of fields of an IE; any unit set in the second information unit set comprises information in all or part of fields of an IE.

In one embodiment, the first signaling indicates the first information unit out of the target information unit set.

In one embodiment, the first signaling indicates an index of the first information unit in the target information unit set.

In one embodiment, if the signaling identifier of the first signaling belongs to a fifth identifier subset, the target information unit set is the first information unit set; if the signaling identifier of the first signaling belongs to a sixth identifier subset, the target information unit set is the second information unit set; there isn't any signaling identifier belonging to the fifth identifier subset and the sixth identifier subset simultaneously.

In one subembodiment, the fifth identifier subset comprises a C-RNTI.

In one subembodiment, the sixth identifier subset comprises a CS-RNTI.

In one subembodiment, the fifth identifier subset comprises an MCS-C-RNTI.

In one subembodiment, the sixth identifier subset comprises an SP-CSI-RNTI.

In one embodiment, any information unit in the first information unit set comprises a first field, and any information unit in the second information unit set comprises the first field; the first field of any information unit in the first information unit set is equal to a first parameter, and the first field of any information unit in the second information unit set is equal to a second parameter, the first parameter differing from the second parameter; the first field indicates a time-domain behavior of a corresponding information unit.

In one subembodiment, the first field comprises all or part of information carried by a higher layer parameter reportConfigType.

In one subembodiment, the first field comprises all or part of information carried by a higher layer parameter resourceType.

In one subembodiment, the first field of the first information unit indicates a time-domain behavior of the first information block.

In one subembodiment, the first field of the first information unit indicates a time-domain behavior of the first reference signal.

In one subembodiment, the first parameter is "aperiodic", and the second parameter is "semi-persistent".

Embodiment 33

Embodiment 33 illustrates a schematic diagram of a second index according to one embodiment of the present disclosure; as shown in FIG. 33. In Embodiment 33, the second information block indicates the second index; when the first information is used to determine that the first index is not used by the first node for determining a spatial relation of the first reference signal, the second index is used by the first node for determining a spatial relation of the first reference signal.

In one embodiment, if the first information indicates that the first index is not used for determining a spatial relation of the first reference signal, the second index is used for determining a spatial relation of the first reference signal.

In one embodiment, if the first information indicates that the first index is used for determining a spatial relation of the first reference signal, a spatial relation of the first reference signal is unrelated to the second index.

In one embodiment, the second information block is carried by a higher layer signaling.

In one embodiment, the second information block is carried by an RRC signaling.

In one embodiment, the second information block is carried by a MAC CE signaling.

In one embodiment, the second information block comprises a positive integer number of information bit(s).

In one embodiment, the second information block comprises information in all or part of fields of an IE.

In one embodiment, the second information block comprises information in all or part of fields of a CSI-ResourceConfig IE.

In one embodiment, the second information block comprises information in all or part of fields of an NZP-CSI-RS-ResourceSet IE.

In one embodiment, the second information block comprises information in all or part of fields of an NZP-CSI-RS-Resource IE.

In one embodiment, the second information block comprises information in all or part of fields of an SRS-Config IE.

In one embodiment, the second information block comprises information in all or part of fields of an SRS-Resource Set IE.

In one embodiment, the second information block comprises information in all or part of fields of an SRS-Resource IE.

In one embodiment, the second information block indicates configuration information of the first reference signal.

In one embodiment, the second index is a non-negative integer.

In one embodiment, the second index comprises a TCI-StateId.

In one embodiment, the second index comprises a CRI.

In one embodiment, the second index comprises an SRI.

In one embodiment, the second index comprises an SSBRI.

In one embodiment, the second index comprises an NZP-CSI-RS-ResourceId.

In one embodiment, the second index comprises an SSB-Index.

In one embodiment, the second index comprises an SRS-ResourceId.

In one embodiment, the second index comprises a BWP-Id.

In one embodiment, the second index comprises all or part of information in a qcl-InfoPeriodicCSI-RS field of an NZP-CSI-RS-Resource IE.

In one embodiment, the second index comprises all or part of information in a csi-RS field or an associatedCSI-RS field of an SRS-ResourceSet IE.

In one embodiment, the second index comprises all or part of information in a spatialRelationInfo field of an SRS-Resource IE.

In one embodiment, the second index is used for determining a third reference signal; when the first information indicates that the first index is not used for determining a spatial relation of the first reference signal, the third reference signal is used to determine the spatial relation of the first reference signal.

In one subembodiment, the second index is an indicator of the third reference signal.

In one subembodiment, the second index indicates the third reference signal.

In one subembodiment, the third reference signal comprises a CSI-RS.

In one subembodiment, the third reference signal comprises an SSB.

In one subembodiment, the third reference signal comprises an SRS.

Embodiment 34

Embodiment 34 illustrates a schematic diagram of a given reference signal being used to determine a spatial relation of a first reference signal according to one embodiment of the present disclosure; as shown in FIG. 34. In Embodiment 34, the given reference signal is the second reference signal or the third reference signal.

In one embodiment, the given reference signal is the second reference signal.

In one embodiment, the given reference signal is the third reference signal.

In one embodiment, the phrase that the given reference signal is used to determine a spatial relation of the first reference signal includes a meaning that large-scale properties of a channel that the first reference signal goes through can be inferred from large-scale properties of a channel that the given reference signal goes through.

In one embodiment, the phrase that the given reference signal is used to determine a spatial relation of the first reference signal includes a meaning that the first node employs a same spatial domain filter to receive the given reference signal and the first reference signal.

In one embodiment, the phrase that the given reference signal is used to determine a spatial relation of the first reference signal includes a meaning that the first node employs a same spatial domain filter to receive the given reference signal and transmit the first reference signal.

In one embodiment, the phrase that the given reference signal is used to determine a spatial relation of the first reference signal includes a meaning that the first node employs a same spatial domain filter to transmit the given reference signal and the first reference signal.

In one embodiment, the phrase that the given reference signal is used to determine a spatial relation of the first reference signal includes a meaning that the first node employs a same spatial domain filter to transmit the given reference signal and receive the first reference signal.

In one embodiment, the phrase that the given reference signal is used to determine a spatial relation of the first reference signal includes a meaning that a DMRS port of the first reference signal is QCL with a transmission antenna port of the given reference signal.

In one embodiment, the phrase that the given reference signal is used to determine a spatial relation of the first reference signal includes a meaning that a DMRS port of the first reference signal is QCL with a transmission antenna port of the given reference signal, with a corresponding QCL type being QCL-TypeD.

Embodiment 35

Embodiment 35 illustrates a structure block diagram of a processing device in a first node according to one embodiment of the present disclosure; as shown in FIG. 35. In FIG. 35, a processing device 3500 in a first node comprises a first receiver 3501 and a first processor 3502.

In Embodiment 35, the first receiver 3501 receives a first signaling; the first processor 3502 receives a first reference signal and a first signal, or the first processor 3502 transmits a first reference signal and a first signal.

In Embodiment 35, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, the first processor 3502 receives the first reference signal and the first signal.

In one embodiment, the first processor 3502 transmits the first reference signal and the first signal.

In one embodiment, the first signaling is used to determine a first priority, the first priority being used to determine the first information.

In one embodiment, the first signaling indicates a first MCS index from a first MCS index set, the first MCS index is applied to the first signal, and the first MCS index set is used to determine the first information.

In one embodiment, a time-domain behavior of the first reference signal is used to determine the first information.

In one embodiment, the first processor 3502 transmits a first information block; herein, the first processor 3502 receives the first reference signal and the first signal; a measurement on the first reference signal is used to determine the first information block.

In one embodiment, the first information block comprises a first channel quality, and a first resource block is a reference resource corresponding to the first channel quality; a frequency-domain resource occupied by the first signal is used to determine a frequency-domain resource occupied by the first resource block.

In one embodiment, the first information unit belongs to a target information unit set; the target information unit set is a first information unit set or a second information unit set; a first signaling identifier of the first signaling is used to determine the target information unit set.

In one embodiment, the first processor 3502 receives a second information block; herein, the second information block indicates a second index; when the first information is used to determine that the first index is not used for determining a spatial relation of the first reference signal, the second index is used to determine a spatial relation of the first reference signal.

In one embodiment, the first node is a UE.

In one embodiment, the first node is a relay node.

In one embodiment, the first receiver 3501 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 3502 comprises at least one of the antenna 452, the receiver/transmitter 454, the receiving processor 456, the transmitting processor 468, the multi-antenna receiving processor 458, the multi-antenna transmitting processor 457, the controller/processor 459, the memory 460 or the data source 467 in Embodiment 4.

Embodiment 36

Embodiment 36 illustrates a structure block diagram of a processing device in a second node according to one embodiment of the present disclosure; as shown in FIG. 36. In FIG. 36, a processing device 3600 in a second node comprises a first transmitter 3601 and a second processor 3602.

In Embodiment 36, the first transmitter 3601 transmits a first signaling; the second processor 3602 transmits a first reference signal and a first signal, or, the second processor 3602 receives a first reference signal and a first signal.

In Embodiment 36, the first signaling comprises scheduling information of the first signal; the first signaling indicates a first information unit, the first information unit being used to determine the first reference signal; the first signaling is used to determine a first index, the first index being used to determine a spatial relation of the first signal; first information is used to determine whether the first index is used for determining a spatial relation of the first reference signal, and the first signaling is used to determine the first information.

In one embodiment, the second processor 3602 transmits the first reference signal and the first signal.

In one embodiment, the second processor 3602 receives the first reference signal and the first signal.

In one embodiment, the first signaling is used to determine a first priority, the first priority being used to determine the first information.

In one embodiment, the first signaling indicates a first MCS index from a first MCS index set, the first MCS index is applied to the first signal, and the first MCS index set is used to determine the first information.

In one embodiment, a time-domain behavior of the first reference signal is used to determine the first information.

In one embodiment, the second processor 3602 receives a first information block; herein, the second processor 3602 transmits the first reference signal and the first signal; a measurement on the first reference signal is used to determine the first information block.

In one embodiment, the first information block comprises a first channel quality, and a first resource block is a reference resource corresponding to the first channel quality; a frequency-domain resource occupied by the first signal is used to determine a frequency-domain resource occupied by the first resource block.

In one embodiment, the first information unit belongs to a target information unit set; the target information unit set is a first information unit set or a second information unit set; a first signaling identifier of the first signaling is used to determine the target information unit set.

In one embodiment, the second processor 3602 transmits a second information block; herein, the second information block indicates a second index; when the first information is used to determine that the first index is not used for determining a spatial relation of the first reference signal, the second index is used to determine a spatial relation of the first reference signal.

In one embodiment, the second node is a base station.
In one embodiment, the second node is a UE.
In one embodiment, the second node is a relay node.

In one embodiment, the first transmitter 3601 comprises at least one of the antenna 420, the transmitter 418, the transmitting processor 416, the multi-antenna transmitting processor 471, the controller/processor 475 or the memory 476 in Embodiment 4.

In one embodiment, the second processor 3602 comprises at least one of the antenna 420, the receiver/transmitter 418, the receiving processor 470, the transmitting processor 416, the multi-antenna receiving processor 472, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A user equipment (UE), comprising:
a receiver; and
a processor;
wherein the receiver and the processor are configured to:
    receive downlink control information (DCI) and radio resource control (RRC) signaling;
    determine, based on the DCI, a first radio resource and a first resource size;
    determine, based on the RRC signaling, a second radio resource and a second resource size; and
    wherein the first resource size and second resources size satisfy at least one of: (i) a ratio of the second resource size to the first resource size is less than or equal to a first threshold, or (ii) a difference between the second resource size and the first resource size is less than or equal to a second threshold.
2. The UE of claim 1, wherein the first radio resource is a physical uplink control channel (PUCCH) resource.
3. The UE of claim 1, wherein the second radio resource is a physical uplink control channel (PUCCH) resource.

4. The UE of claim 1, wherein at least one of the first threshold and the second threshold is configurable via the RRC signaling.

5. The UE of claim 1, wherein the first resource size is determined based on (i) a number of bits indicated by the DCI and (ii) a first code rate.

6. The UE of claim 1, wherein the maximum value of the second resource size is based on: (i) the first resource size and (ii) the first threshold.

7. The UE of claim 1, wherein the second resource size is used to determine: (i) a size of a time-frequency resource occupied by a transmission on the first radio resource and (ii) a number of bits associated with the RRC signaling.

8. The UE of claim 1, wherein the first radio resource and the second radio resource are multiplexed within a single uplink occasion.

9. The UE of claim 1, wherein the DCI indicates a first priority and the RRC signaling indicates a second priority, the first priority being different from the second priority.

10. A method performed by a user equipment (UE), the method comprising:

receiving downlink control information (DCI) and radio resource control (RRC) signaling;

determining, based on the DCI, a first radio resource and a first resource size;

determining, based on the RRC signaling, a second radio resource and a second resource size; and wherein the first resource size and second resources size satisfy at least one of: (i) a ratio of the second resource size to the first resource size is less than or equal to a first threshold, or (ii) a difference between the second resource size and the first resource size is less than or equal to a second threshold.

11. The method of claim 10, wherein the first radio resource is a physical uplink control channel (PUCCH) resource.

12. The method of claim 10, wherein the second radio resource is a physical uplink control channel (PUCCH) resource.

13. The method of claim 10, wherein at least one of the first threshold and the second threshold is configurable via the RRC signaling.

14. The method of claim 10, wherein the first resource size is determined based on (i) a number of bits indicated by the DCI and (ii) a first code rate.

15. The method of claim 10, wherein the maximum value of the second resource size is based on: (i) the first resource size and (ii) the first threshold.

16. The method of claim 10, wherein the second resource size is used to determine: (i) a size of a time-frequency resource occupied by a transmission on the first radio resource and (ii) a number of bits associated with the RRC signaling.

17. The method of claim 10, wherein the first radio resource and the second radio resource are multiplexed within a single uplink channel.

18. The method of claim 10, wherein the DCI indicates a first priority and the RRC signaling indicates a second priority, the first priority being different from the second priority.

19. A base station (BS), comprising:

a transmitter; and a processor;

wherein the transmitter and the processor are configured to:

transmit downlink control information (DCI) indicating a first radio resource and a first resource size;

transmit radio resource control (RRC) signaling indicating a second radio resource and a second resource size; and wherein the first resource size and second resources size satisfy at least one of: (i) a ratio of the second resource size to the first resource size is less than or equal to a first threshold, or (ii) a difference between the second resource size and the first resource size is less than or equal to a second threshold.

20. The BS of claim 19, wherein the RRC signaling configures at least one of the first threshold or the second threshold.

* * * * *